United States Patent
Park et al.

(10) Patent No.: US 10,892,478 B2
(45) Date of Patent: *Jan. 12, 2021

(54) NEGATIVE ELECTRODE ACTIVE MATERIAL FOR SECONDARY BATTERY AND PREPARING METHOD THEREOF

(71) Applicant: Iljin Electric Co., Ltd., Gyeonggi-do (KR)

(72) Inventors: Cheol Ho Park, Gyeonggi-do (KR); Min Hyun Kim, Seoul (KR); Young Pil Choi, Gyeonggi-do (KR); Seon Kyong Kim, Seoul (KR)

(73) Assignee: Iljin Electric Co., Ltd.

( * ) Notice: Subject to any disclaimer, the term of this patent is extended or adjusted under 35 U.S.C. 154(b) by 200 days.

This patent is subject to a terminal disclaimer.

(21) Appl. No.: 15/738,649

(22) PCT Filed: May 31, 2016

(86) PCT No.: PCT/KR2016/005759
§ 371 (c)(1),
(2) Date: Dec. 21, 2017

(87) PCT Pub. No.: WO2016/208882
PCT Pub. Date: Dec. 29, 2016

(65) Prior Publication Data
US 2018/0175380 A1 Jun. 21, 2018

(30) Foreign Application Priority Data
Apr. 18, 2016 (KR) .................. 10-2016-0047098

(51) Int. Cl.
*H01M 4/36* (2006.01)
*H01M 4/38* (2006.01)
(Continued)

(52) U.S. Cl.
CPC .......... *H01M 4/366* (2013.01); *C01B 33/037* (2013.01); *H01M 4/134* (2013.01);
(Continued)

(58) Field of Classification Search
CPC ...... H01M 4/363; H01M 4/366; H01M 4/386; H01M 4/362; H01M 4/364; H01M 4/134;
(Continued)

(56) References Cited

U.S. PATENT DOCUMENTS 9,722,243 B2 * 8/2017 Park ................. H01M 10/052
9,761,873 B2 * 9/2017 Ide .......................... C01B 33/02
(Continued)

FOREIGN PATENT DOCUMENTS

JP 2005-347076 A 12/2005
JP 2013-105655 A 5/2013
(Continued)

*Primary Examiner* — Gregg Cantelmo
(74) *Attorney, Agent, or Firm* — Husch Blackwell LLP

(57) ABSTRACT

Provided are a negative electrode active material for a secondary battery, which suppresses a dispersal phenomenon of a negative electrode active material during charging/discharging by controlling a lattice mismatch ratio of an amorphous matrix layer to a silicon layer in a silicon-based negative electrode active material.

15 Claims, 14 Drawing Sheets

(51) Int. Cl.
*H01M 4/134* (2010.01)
*H01M 4/1395* (2010.01)
*C01B 33/037* (2006.01)
*H01M 10/0525* (2010.01)
*H01M 10/052* (2010.01)
*H01M 4/02* (2006.01)

(52) U.S. Cl.
CPC ......... *H01M 4/1395* (2013.01); *H01M 4/362* (2013.01); *H01M 4/386* (2013.01); *H01M 10/0525* (2013.01); *C01P 2002/70* (2013.01); *H01M 10/052* (2013.01); *H01M 2004/027* (2013.01)

(58) Field of Classification Search
CPC ............ H01M 4/1395; H01M 10/0525; C01B 33/037
See application file for complete search history.

(56) References Cited

U.S. PATENT DOCUMENTS

| | | |
|---|---|---|
| 2007/0128517 A1 | 6/2007 | Christensen et al. |
| 2012/0152354 A1* | 6/2012 | Boukai .................... H01B 1/04 136/261 |
| 2012/0319038 A1* | 12/2012 | Ide ........................ H01M 4/386 252/182.1 |
| 2013/0122368 A1 | 5/2013 | Shinya et al. |
| 2013/0130101 A1 | 5/2013 | Kim et al. |
| 2014/0065485 A1* | 3/2014 | Shinya .................. H01M 4/364 429/225 |
| 2014/0183406 A1* | 7/2014 | Ide .......................... C01B 33/02 252/182.1 |

FOREIGN PATENT DOCUMENTS

| | | |
|---|---|---|
| JP | 2013-253012 A | 12/2013 |
| JP | 2014-053132 A | 3/2014 |
| JP | 5621753 B2 | 10/2014 |
| KR | 10-2013-0044627 A | 5/2013 |
| KR | 10-1356988 B1 | 2/2014 |
| KR | 10-2015-0018337 A | 2/2015 |

\* cited by examiner

[Fig. 1a]
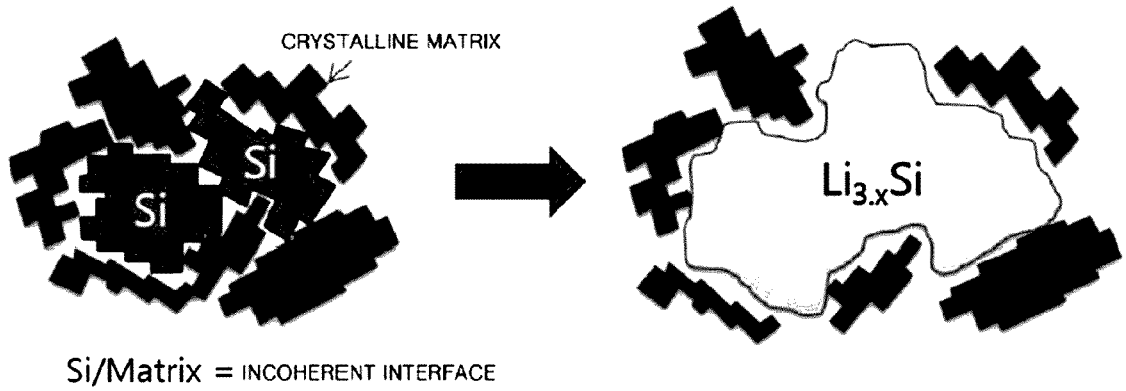
Si/Matrix = INCOHERENT INTERFACE
[Fig. 1b]
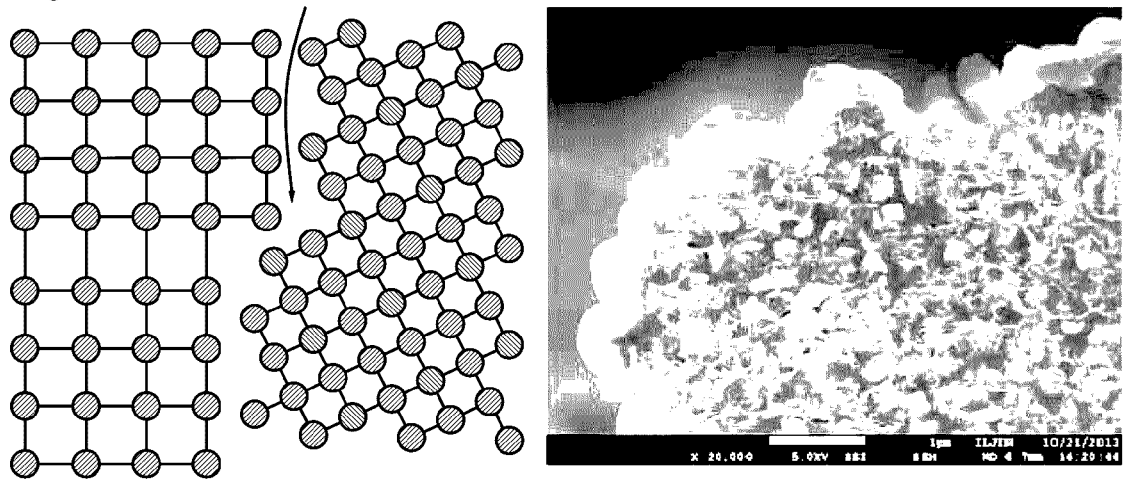
[Fig. 2a]
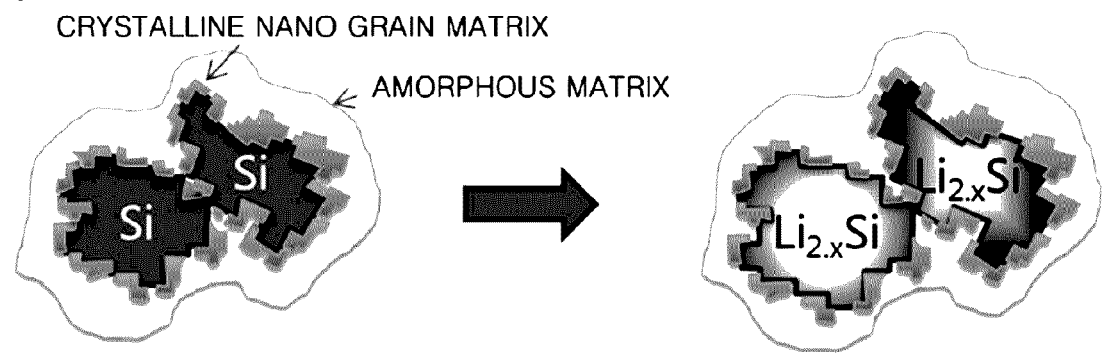
Si/Matrix = COHERENT OR SEMI-COHERENT INTERFACE

[Fig. 3b]
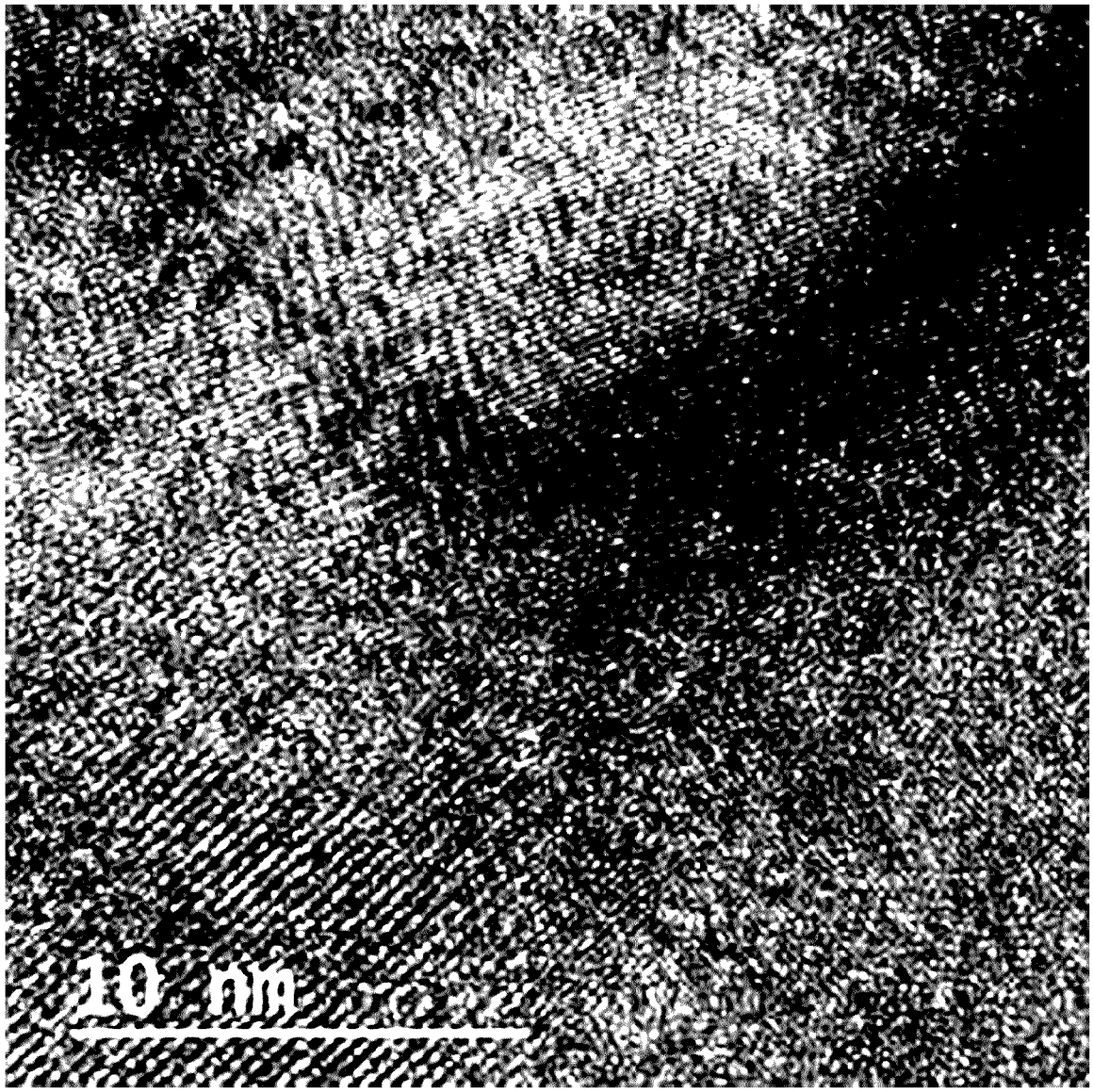
[Fig. 4a]
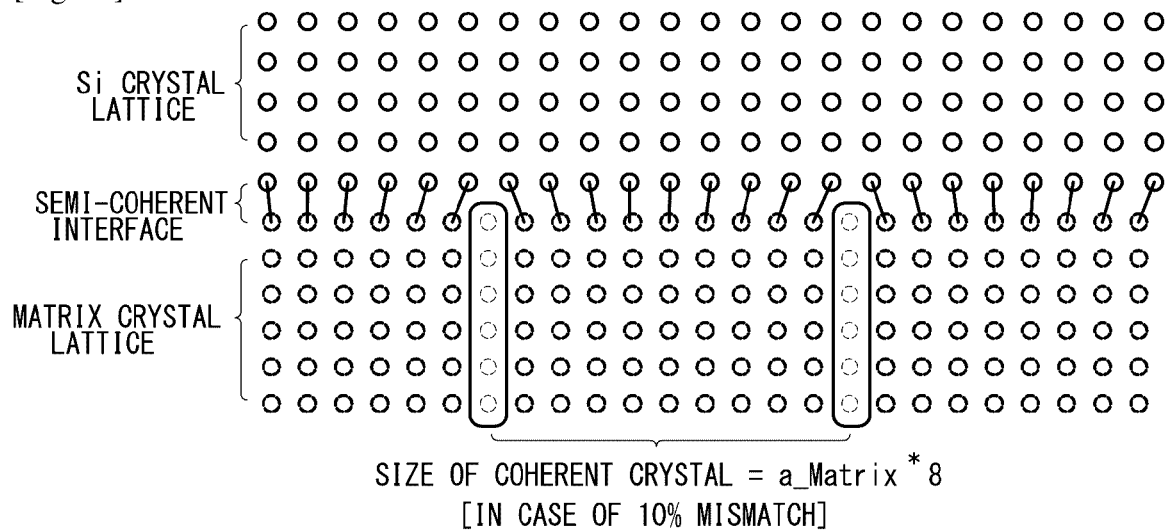
SIZE OF COHERENT CRYSTAL = a_Matrix * 8
[IN CASE OF 10% MISMATCH]

[Fig. 4b]
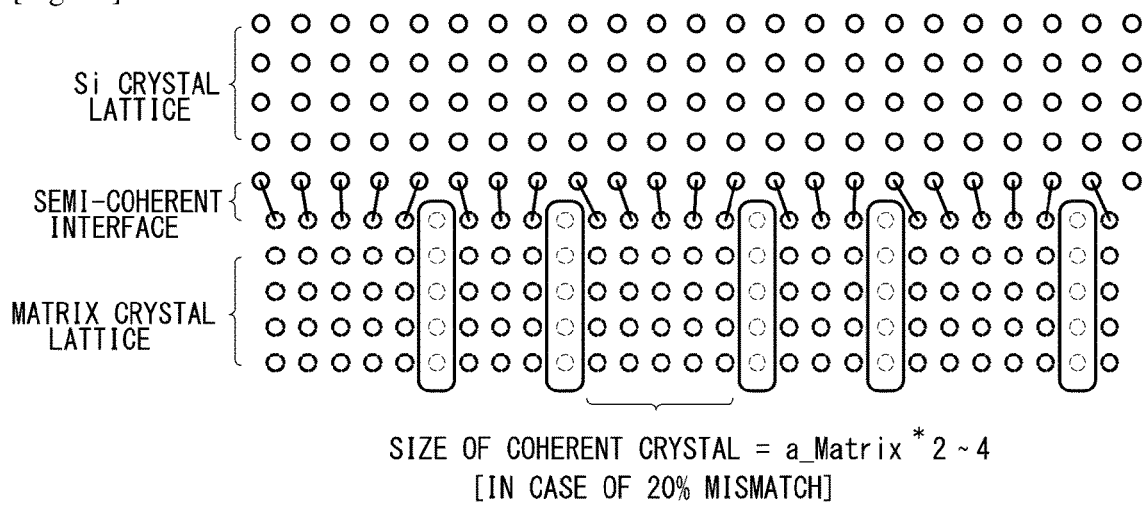
SIZE OF COHERENT CRYSTAL = a_Matrix * 2 ~ 4
[IN CASE OF 20% MISMATCH]
[Fig. 4c]
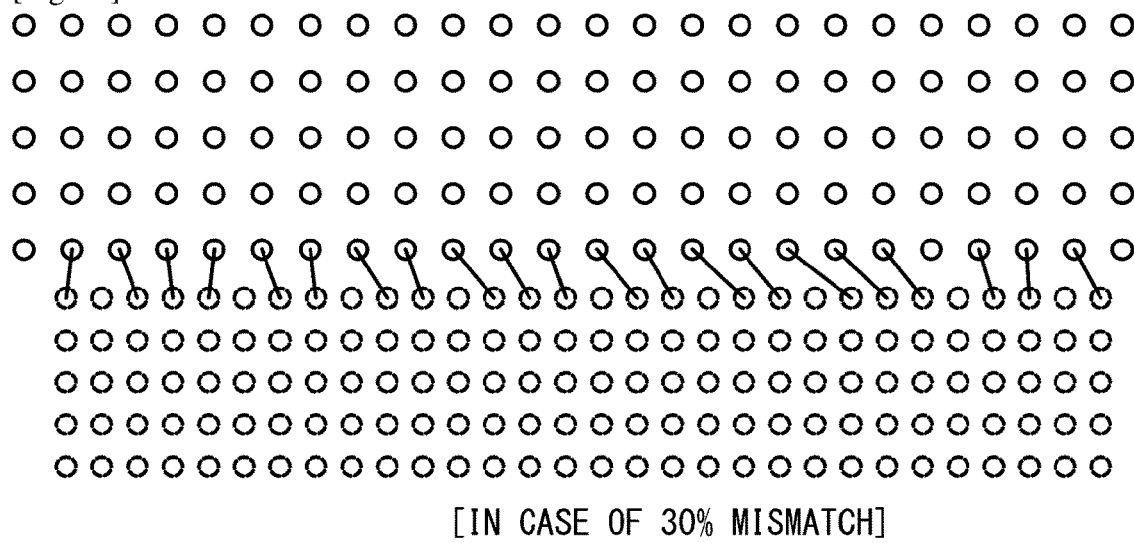
[IN CASE OF 30% MISMATCH]
[Fig. 4d]
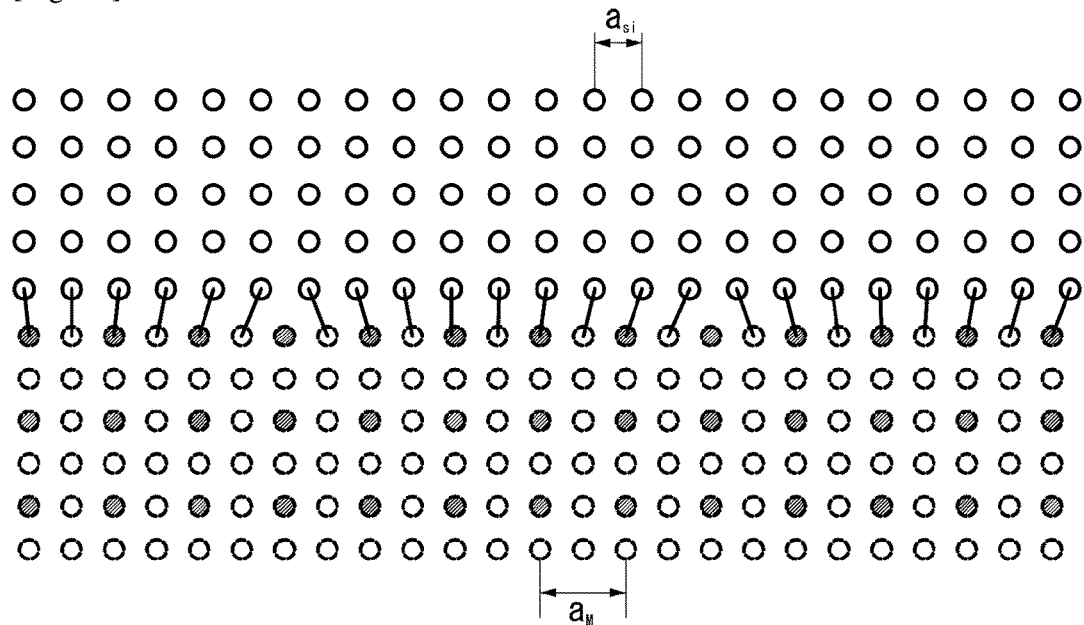

[Fig. 5a]
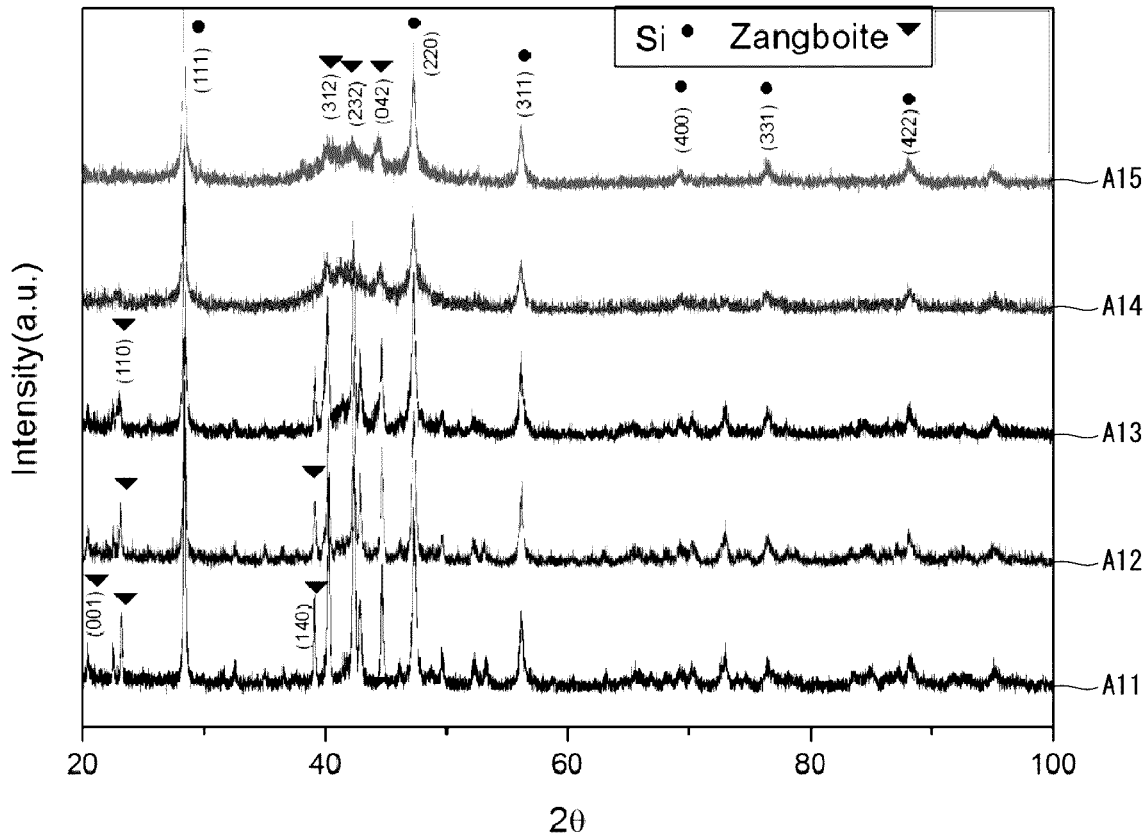
[Fig. 5b]
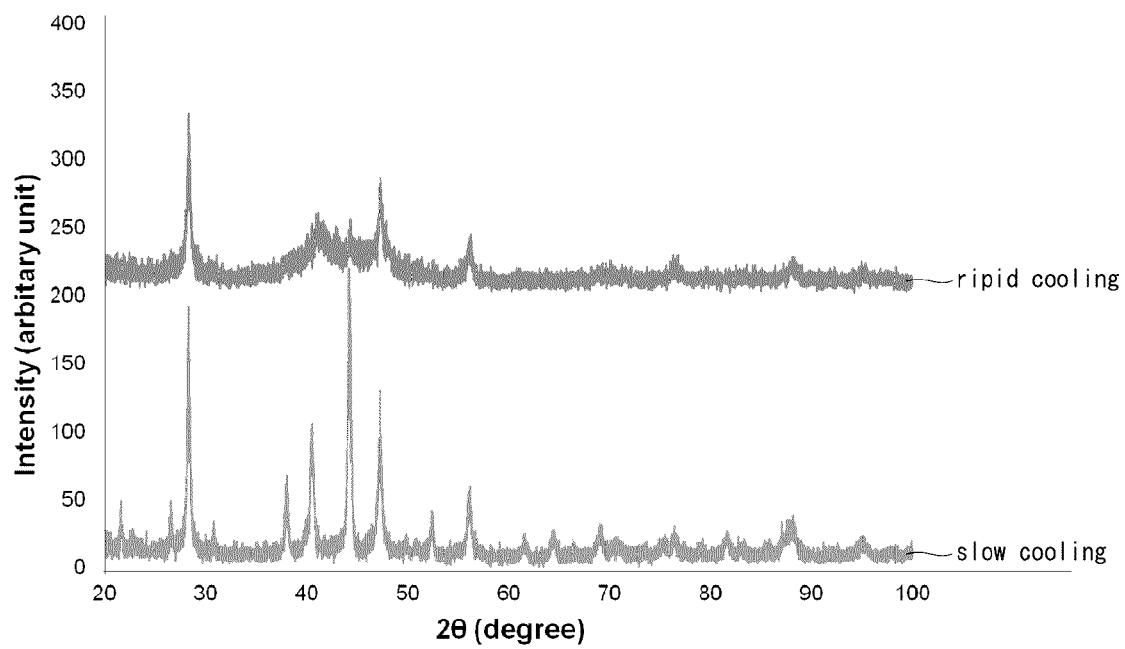

[Fig. 5c]
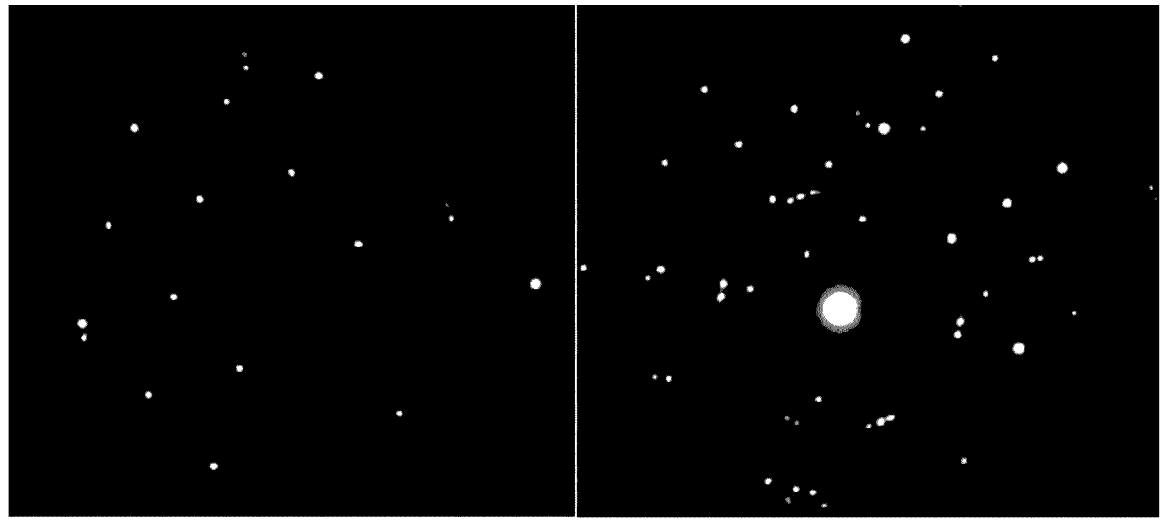
[3 fold pattern]　　　　　　　　[4 fold pattern]
[Fig. 6]
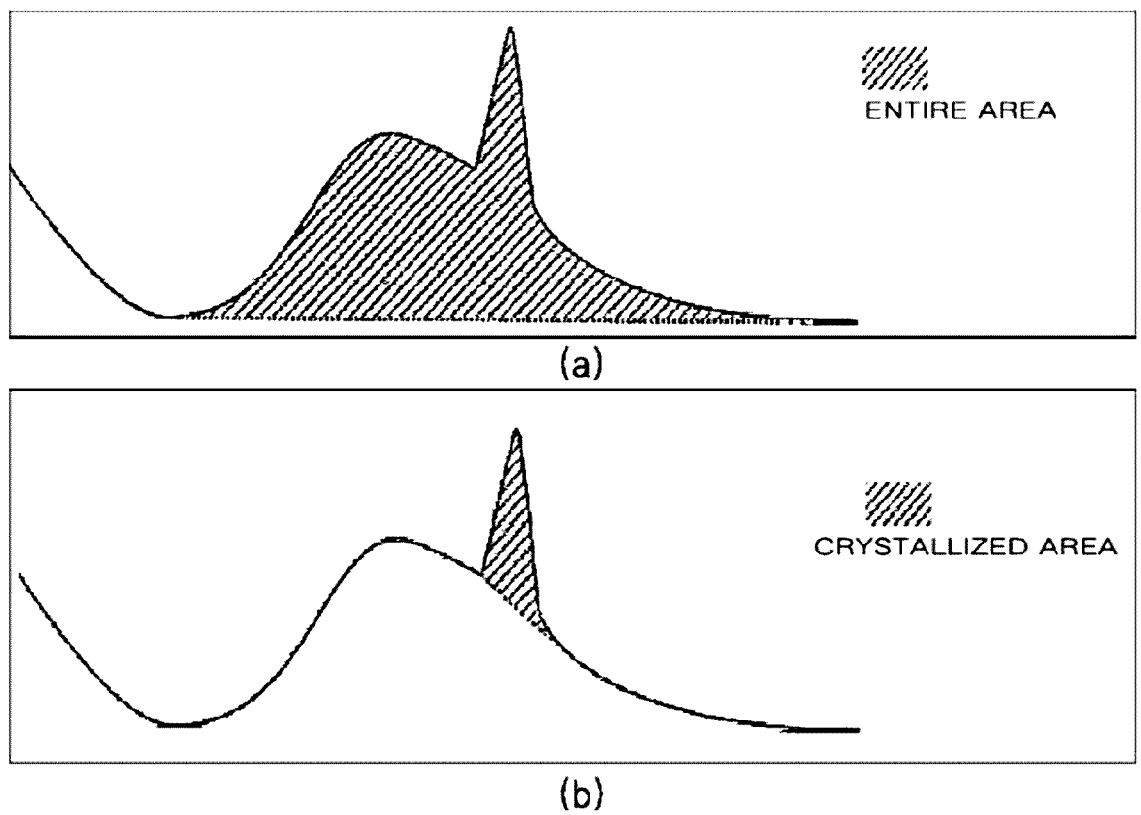

[Fig. 7]
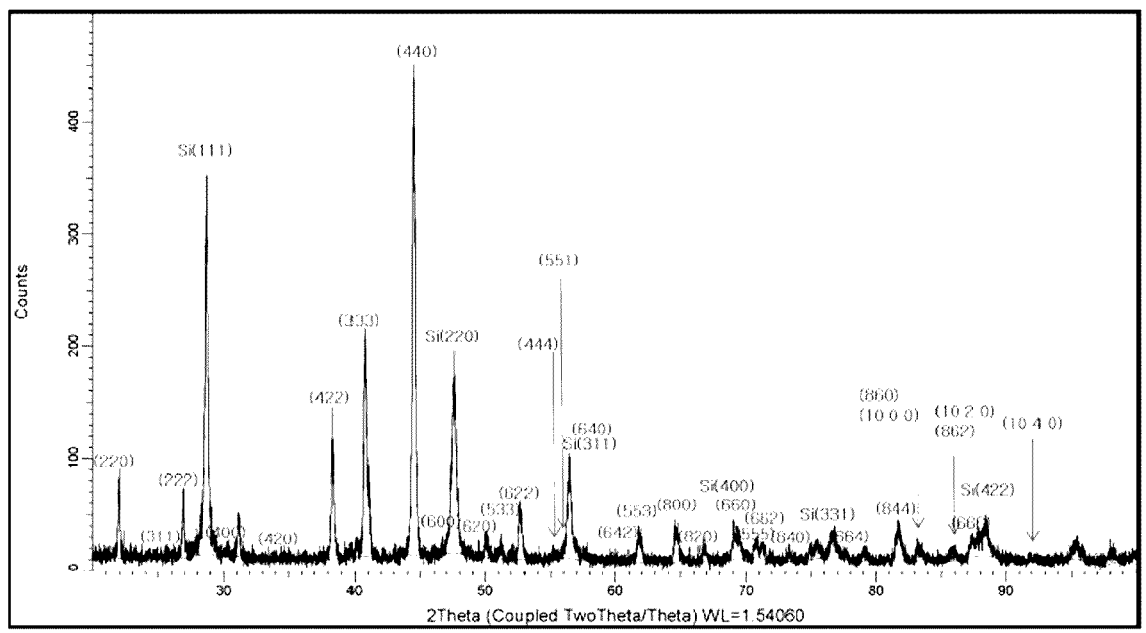
[Fig. 8]
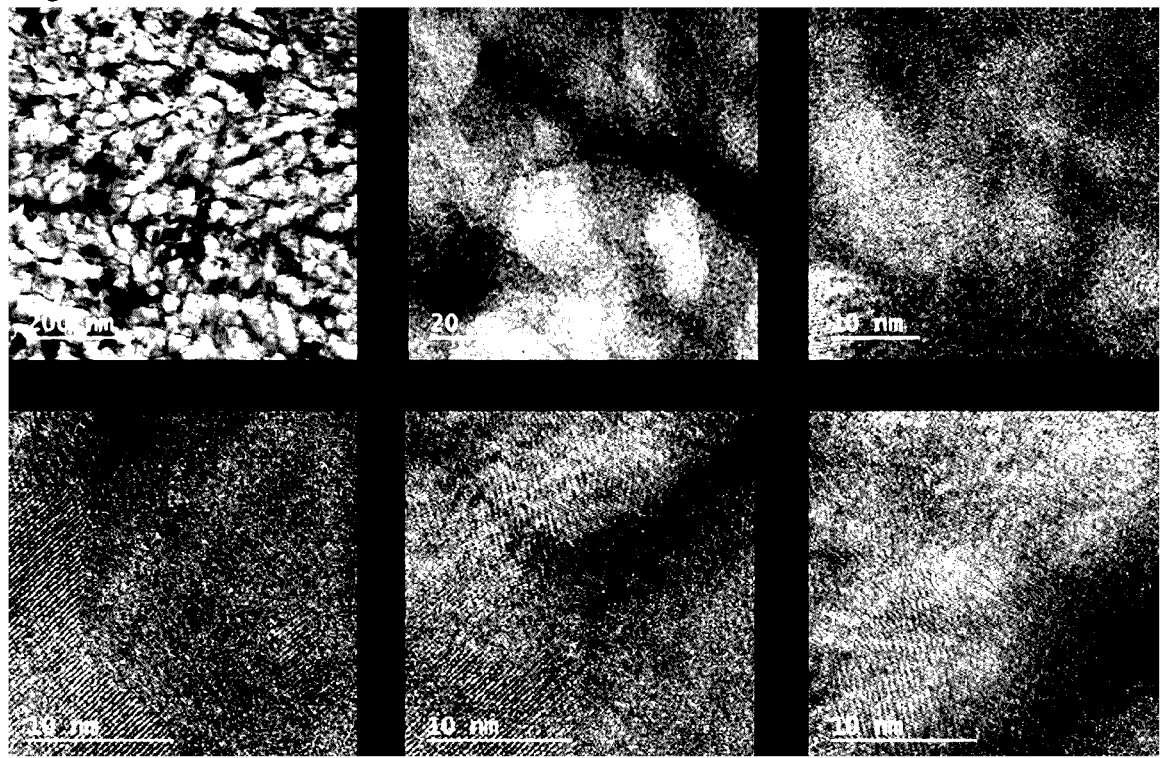

NEGATIVE ELECTRODE ACTIVE MATERIAL FOR SECONDARY BATTERY AND PREPARING METHOD THEREOF

CROSS REFERENCE TO RELATED APPLICATIONS

This application is a U.S. National Phase Application of International Application No. PCT/KR2016/005759 filed on May 31, 2016; said application claims priority to and the benefit of Korean Patent Application Nos. 10-2015-0088613 and 10-2016-0047098 filed in the Korean Intellectual Property Office on Jun. 22, 2015 and Apr. 18, 2016 respectively. The disclosures of International Application No. PCT/KR2016/005759 and Korean Patent Application Nos. 10-2015-0088613 and 10-2016-0047098 are incorporated herein by reference in their entirety.

TECHNICAL FIELD

An embodiment of the present invention relates to a negative electrode active material for a secondary battery and a preparing method thereof.

BACKGROUND ART

A lithium battery in the related art uses a lithium metal as a negative electrode active material, but when a lithium metal is used, a battery is short-circuited by formation of dendrite to cause danger of explosion, so that a carbon-based material is widely used as a negative electrode active material, instead of a lithium metal.

The carbon-based active material includes crystalline carbon, such as graphite and synthetic graphite, and amorphous carbon, such as soft carbon and hard carbon. However, the amorphous carbon has a large capacity, but has a problem in that irreversibility is large during a charging/discharging process. Graphite is representatively used as the crystalline carbon, and has a theoretical limit capacity of 372 mAh/g, which is large, so that is used as a negative electrode active material.

However, even though a theoretical capacity the graphite or the carbon-based active material is slightly large, the theoretical capacity is simply about 380 mAh/g, so that there is a problem in that the aforementioned negative electrode cannot be used when a high capacity lithium battery is future developed.

In order to solve the problem, research on a metal-based or intermetallic compound-based negative electrode active material has been currently and actively conducted. For example, research on a lithium battery utilizing metal, such as aluminum, germanium, silicon, tin, zinc, and lead, or semimetal as a negative electrode active material has been conducted. The material has a high capacity and a high energy density, and capable of occluding and discharging larger lithium ions than the negative electrode active material using the carbon-based material, so that it is possible to manufacture a battery having a high capacity and a high energy density. For example, it is known that pure silicon has a large theoretical capacity of 4,017 mAh/g. However, compared to the carbon-based material, the metal-based or intermetallic compound-based negative electrode active material has a cycle characteristic degradation to be obstacles to commercialization. The reason is that when the silicon is used as a negative electrode active material for occluding and discharging lithium as it is, conductivity between active materials may deteriorate due to a change in a volume during a charging/discharging process, or a negative electrode active material is peeled from a negative current collector. That is, the silicon including the negative electrode active material occludes lithium by charging and is expanded to have a volume of about 300 to 400%, and when lithium is discharged during the discharging, the negative electrode active material are contracted.

When the aforementioned charging/discharging cycle is repeated, electric insulation may be incurred due to a crack of the negative electrode active material, so that a lifespan of the lithium battery is sharply decreased, so that the aforementioned negative electrode active material has a problem to be used in the lithium battery.

In order to solve the problem, lots of searches for improving stability of a charging/discharging cycle by controlling a reaction speed through an adjustment of a contact reaction area and a concentration of silicon and lithium ions through surface modification and thin film coating of the silicon, metal alloy and distribution, partial coating of an inert material, such as deposition of a Diamond Like Carbon (DLC) having low reactivity to silicon or carbon, or the like. However, a thin film generated by a physical deposition or a chemical deposition that is a vacuum process exhibits high charging/discharging cycle efficiency, but when a thickness of the thin film is larger, deterioration and diffusion resistance of lithium ions due to an increase in electric resistance are increased, so that an electrochemical characteristic is sharply decreased.

Further, technology of preparing a negative electrode active material enabling a lithium secondary battery to have a high capacity, such as technology of mixing or coating a carbon-based material, such as silicon and graphite and technology of alloying silicon and various metals, has been studied, but the negative electrode active material has a problem in being commercialized as a negative electrode active material for a lithium secondary battery due to conductivity decrease, battery performance deterioration, and the like according to continuous charging/discharging.

DISCLOSURE OF INVENTION

Technical Problem

In one embodiment, there is provided a negative electrode active material for a secondary battery, in which a crystal lattice mismatch ratio of a matrix layer to an Si layer are controlled in the Si layer that is a crystal layer and the matrix layer mixed with the Si layer in a silicon-based negative electrode active material.

In another embodiment, there are provided a negative electrode active material for a secondary battery, which provides a dispersal suppressing mechanism during a life progress of a silicon-based negative electrode active material, and a preparing method thereof.

In another embodiment, there are provided a negative electrode active material for a secondary battery, which has a small change in volume during charging/discharging, so that electric insulation is not generated well, and has excellent initial efficient and a capacity maintenance characteristic, and a preparing method thereof.

Solution to Problem

An embodiment of the present invention provides a negative electrode active material for a secondary battery, including: a silicon (Si) layer that is a crystal layer; and a matrix layer mixed with the Si layer, in which a crystal lattice parameter of the matrix layer is a ½ time or an integer time of a crystal lattice parameter of the Si layer.

Another embodiment of the present invention provides a negative electrode active material for a secondary battery, including: a silicon (Si) layer that is a crystal layer; and a matrix layer mixed with the Si layer, in which a crystal lattice mismatch ratio of the matrix layer to the Si layer is within 20%.

The lattice mismatch ratio of the matrix layer to the Si layer may be within 10%.

The lattice parameter of the matric layer may be obtained by any one of the equations below. In this case, $a_{Si}$ is a lattice parameter of a Si crystal, and $a_{Matrix\_cubic}$ is a lattice parameter of a matrix layer crystal (particularly, when the matrix layer has a cubic structure).

$$a_{Si}=5.431 \text{ Å}$$

$$a_{Matrix\_cubic}=\frac{1}{2}(a_{Si}\pm20\%)=2.172\sim3.259 \text{ Å}$$

$$a_{Matrix\_cubic}=a_{Si}\pm20\%=4.345\sim6.517 \text{ Å}$$

$$a_{Matrix\_cubic}=2(a_{Si}\pm20\%)=8.690\sim13.03 \text{ Å}$$

Those may be regulated as a general formula below.

$$a_{Matrix\_cubic}=n(a_{Si}\pm20\%).$$

n is an integer, such as ½, 1, 2, 3, . . . .

The lattice parameter of the matric layer may be obtained by any one of the equations below.

$$a_{Matrix\_cubic}=\frac{1}{2}(a_{Si}\pm10\%)=2.444\sim2.987 \text{ Å}$$

$$a_{Matrix\_cubic}=a_{Si}\pm10\%=4.888\sim5.974 \text{ Å}$$

$$a_{Matrix\_cubic}=2(a_{Si}\pm10\%)=9.776\sim11.948 \text{ Å}$$

Those may be regulated as a general formula below.

$$a_{Matrix\_cubic}=n(a_{Si}\pm10\%).$$

n is an integer, such as ½, 1, 2, 3, . . . .

When the matrix layer of the negative electrode active material is crystallized, a crystal system may be a cubic structure, a body-centered cubic (BCC) structure, or a face-centered cubic (FCC) structure. Most particularly, the lattice system may have the FCC structure.

When the matrix layer of the negative electrode active material is crystalized, a crystal system may be a hexagonal close packed (HCP) structure, and a ratio of c/a may be a range of 1.470 to 1.796, and the matrix layer may be regulated by an equation below.

In this case, $a_{Matrix\_HCP}$ is a lattice parameter of an HCP crystal system, and $a_{Matrix\_cubic}$ is a lattice parameter of a cubic crystal system.

$$a_{Matrix\_HCP}=\frac{\sqrt{2}}{2}a_{Matrix\_cubic}$$

In the present invention, the negative electrode active material includes the Si layer, an amorphous matrix layer outside the Si layer, and a nano grain matrix layer formed on an interface of the Si layer and the amorphous matrix layer, and the interface between the Si layer and the amorphous matrix layer is a coherent or a semi-coherent interface.

An amorphization degree of the negative electrode active material may be 25% to 65%, the silicon is crystalline, and the matrix layer is amorphized, so that an XRD peak has a value of $I_{Si}/I_{matrix}>1$. In this case, $I_{Si}$ is an intensity value of a maximum value among the XRD peaks in the silicon, and $I_{matrix}$ is an intensity value of a maximum value among the remaining peaks except for an Si phase.

The negative electrode active material is formed by a chemical formula below, and has an expansion rate after 50 cycles of 70 to 150%, and an amorphization degree of 25% to 65%.

$$Si_xTi_yFe_zAl_u$$

(x, y, z, and u are atom % (at %), x: 1−(y+z+u), y: 0.09 to 0.14, z: 0.09 to 0.14, and u: larger than 0.01 and less than 0.2)

Still another embodiment of the present invention provides a method of preparing a negative electrode active material for a secondary battery having a three-layer structure, the method including: crystallizing a silicon (Si) layer by melting Si and a matrix material together and performing rapid solidification processing on the melted materials, in which a mass percentage of Si melted with the matrix material is 20 wt % to 90 wt %; crystallizing the matrix material into a crystalline nano grain matrix layer on a surface of the crystallized Si layer; and forming an amorphous matrix on a surface of the crystalline nano grain matrix layer, in which a crystal lattice parameter of the matrix layer is a ½ time or an integer times of a crystal lattice parameter of the Si layer, and the negative electrode active material includes the Si layer, the amorphous matrix layer outside the Si layer, and the nano grain matrix layer formed on an interface between the Si layer and the amorphous matrix layer.

Yet another embodiment of the present invention provides a method of preparing a negative electrode active material for a secondary battery having a three-layer structure, the method including: crystallizing a silicon (Si) layer by melting Si and a matrix material together and performing rapid solidification processing on the melted materials, in which a mass percentage of Si melted with the matrix material is 20 wt % to 90 wt %; crystallizing the matrix material into a crystalline nano grain matrix layer on a surface of the crystallized Si layer; and forming an amorphous matrix on a surface of the crystalline nano grain matrix layer, in which a lattice mismatch ratio of the matrix layer to the Si layer is within 20%, and the negative electrode active material includes the Si layer, the amorphous matrix layer outside the Si layer, and the nano grain matrix layer formed on an interface between the Si layer and the amorphous matrix layer.

In the present invention, in the crystallizing of the matrix material into the crystalline nano grain matrix layer, the crystalline nano grain matrix layer begins to be crystallized at a terrace, a ledge, and a kink on an exposed surface of the Si crystal, and a matrix is grown in a direction of reducing interfacial energy.

Still yet another embodiment of the present invention provides a method of preparing a negative electrode active material for a secondary battery, the method including: forming a negative electrode active material, which has a three-layer structure including a silicon (Si) layer, an amorphous matrix layer outside the Si layer, and a nano grain matrix layer formed on an interface between the Si layer and the amorphous matrix layer, by a mechanical alloy method including mixing silicon crystalline powder and matrix powder, and performing ball milling on the powder in which impact is repeatedly applied to the powder by a fall of a ball, so that the powder is grinded and recombined.

When the matrix material is crystallized, a lattice mismatch ratio of the matrix material to the Si crystal may be within 20%.

Advantageous Effects of Invention

According to the embodiments, a phenomenon, in which the silicon-based negative electrode active material is dispersed, is suppressed, so that a crack phenomenon is little generated.

Further, a volume change of the negative electrode active material is small during the charging/discharging of the secondary battery, so that an electric insulation is little generated, and it is possible to obtain the negative electrode active material for a secondary battery having excellent initial efficiency and capacity maintenance characteristic.

BRIEF DESCRIPTION OF DRAWINGS

FIG. 1A is a schematic diagram illustrating an existing silicon alloy-based negative electrode active material, and FIG. 1B is a schematic diagram illustrating a state in which silicon and a matrix material form an inherent interface in FIG. 1A, and a tissue cross-sectional picture after a charging/discharging test with 50 cycles by manufacturing a cell to which the negative electrode active material is applied;

FIG. 2A is a schematic diagram illustrating a three layer structure of a silicon-based negative electrode active material according to an embodiment of the present invention.

FIG. 3B is a tissue picture of a nano grain matrix layer according to an embodiment of the present invention;

FIGS. 4A to 4D are schematic diagrams illustrating a form of an interface according to a lattice mismatch ratio of a matrix to silicon;

FIG. 5A is a diagram illustrating an XRD peak characteristic on silicon and a matrix according to an embodiment of the present invention, FIG. 5B is a diagram illustrating an XRD peak characteristic in a case of slow cooling and a case of fast cooling according to an embodiment of the present invention, and FIG. 5C illustrates a TEM diffraction pattern of a slowly cooled negative electrode active material matrix according to an embodiment of the present invention;

FIG. 6 is a schematic diagram calculating an amorphization degree according to an embodiment of the present invention;

FIG. 7 is a diagram illustrating an XRD pattern about Example 1 using an alloy of Si, Ti, Fe, and Al as an embodiment of the present invention;

FIG. 8 is a TEM picture of a material about Example 1 of FIG. 7;

BEST MODE FOR CARRYING OUT THE INVENTION

Figure 2B:
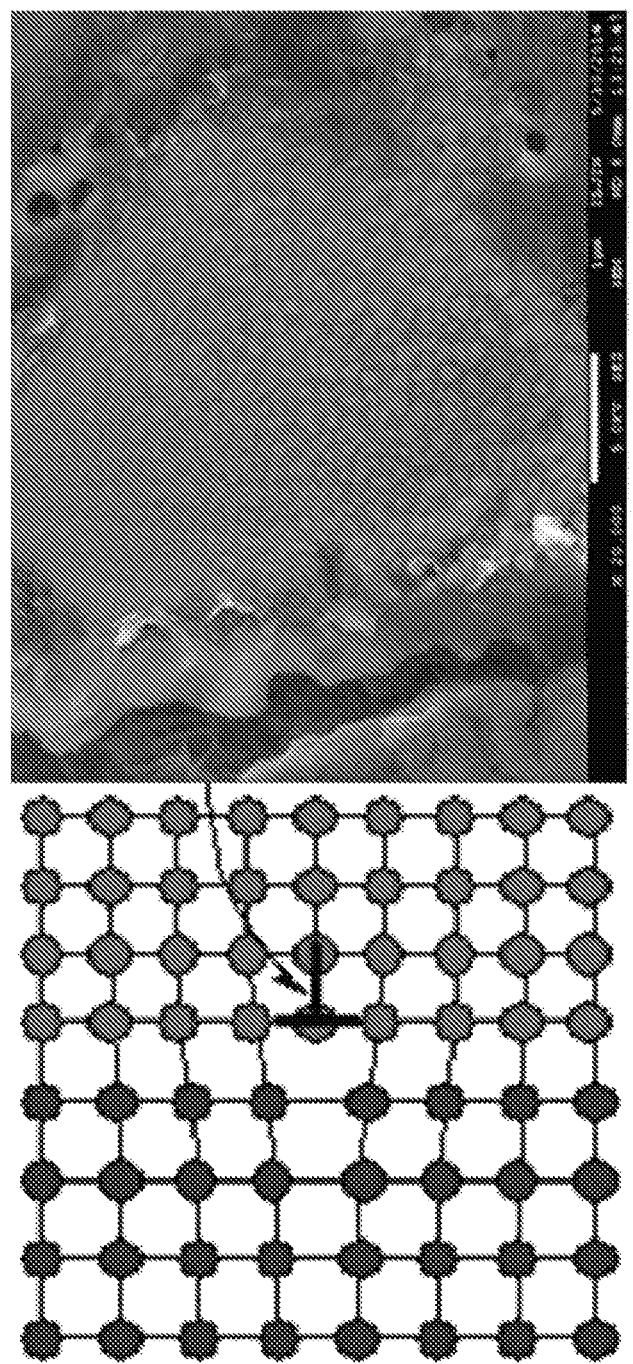
FIG. 2B is a schematic diagram illustrating a state in which silicon and a matrix material form a coherent interface or a semi-coherent interface in FIG. 2A and a tissue picture.

An embodiment of the present invention provides a negative electrode active material for a secondary battery, including: a silicon (Si) layer that is a crystal layer; and a matrix layer mixed with the Si layer, in which a crystal lattice parameter of the matrix layer is a ½ time or an integer time of a crystal lattice parameter of the Si layer.

MODE FOR THE INVENTION

Other detailed matters of the embodiments are included in the detailed description and the drawings.

Various advantages and features of the present disclosure and methods accomplishing thereof will become apparent from the following detailed description of embodiments with reference to the accompanying drawings. However, the present invention is not limited to embodiments disclosed below and may be implemented in various forms, and when one constituent element referred to as being "connected to" another constituent element, one constituent element can be directly coupled to or connected to the other constituent element, but intervening elements may also be present. Further, an irrelevant part to the present invention is omitted to clarify the description of the present invention, and like reference numerals designate like elements throughout the specification.

Hereinafter, the present invention will be described in detail with reference to the accompanying drawings.

[Matrix Material for Suppressing Dispersal of an Active Material in a Silicon-Based Negative Electrode Active Material]

In the embodiment of the present invention, as long as a material has a stable phase, which does not electrochemically react to lithium, or partially reacts to lithium together with silicon, the material may be acceptable as the matrix material.

Further, in the embodiment of the present invention, when the matrix material is crystallized, a lattice system may have all of a simple cubic structure, a Body Centered Cubic (BCC) structure, and a Face Centered Cubic (FCC) structure. Particularly, the lattice system may have the FCC structure.

Further, in the present invention, when the negative electrode active material is crystallized, a crystal system has a hexagonal Close Packed (HCP) structure, and a ratio of c/a may be 1.470 to 1.796 ($\sqrt{(8/3)}\pm10\%$). When $c/a=\sqrt{(8/3)}$ ($\approx1.633$), the HCP structure also has the same nearest neighbor atoms and the same interatomic distance as those of the FCC structure, so that the matrix material may form a coherent interface with silicon and thus the HCP is available.

In the meantime, a lattice parameter of a matrix layer having the HCP structure may be calculated by an equation below. Further, a lattice parameter of a matrix layer may be regulated by the equation below.

$$a_{Matrix\_HCP} = \frac{\sqrt{2}}{2} a_{Matrix\_cubic}$$

Further, a constant of a crystal lattice (lattice parameter) of the matrix material may be similar to ½ time or an integer multiple of a lattice parameter of a silicon crystal. When the lattice parameter of the matrix material is similar to ½ time or an integer multiple of a lattice parameter of a silicon crystal, dispersal of the negative electrode active material is suppressed, so that a crack phenomenon and an electrolyte permeation phenomenon little occur.

In the meantime, a lattice mismatch of the matrix material may be 20% or lower, more preferably, 10% or lower, compared to the silicon lattice. As described above, the negative electrode active material, in which the lattice mismatch of the matrix material is 20% or lower compared to the silicon crystal, is used, so that a dispersal of the negative electrode active material is suppressed, and thus a crack phenomenon and an electrolyte permeation phenomenon do not occur well.

When the lattice mismatch exceeds 20%, dislocation is generated every when four to five of crystal unit cells are stacked. For example, a constant of one side of a unit cell of the silicon is 5.43 Å, so that when a lattice mismatch ratio is 20%, dislocation is generated every about 20 to 25 Å (2 to 2.5 mm). It is determined that the size of 20 to 25 Å (2 to 2.5 mm) is a size of a maximum nano grain when the lattice mismatch ratio is 20%, and when the lattice mismatch ratio exceeds 20%, dislocation is excessively frequently generated, so that it is not determined that the matrix material forms a coherent interface. When the lattice mismatch ratio is 50%, dislocation in the unit cell is generated every other lattice, so that the matrix material forms an incoherent interface.

In the embodiment of the present invention, it can be seen that when a lattice mismatch ratio of a matrix to silicon has a range equal to or smaller than 10%, a dispersal phenomenon of the negative electrode active material is most suppressed. When the lattice mismatch ratio is 10% or smaller, dislocation is generated every about 10 lattices, so that a defectless coherent interface at a level of about 5 nm continues. In this case, compared to the case where the lattice mismatch ratio is 20%, a coherent interface or a semi-coherent interface may be easily generated, so that this feature is advantageous to a preparing process of the negative electrode active material, and a possibility in that nano grains compactly exist on a surface of the silicon crystal becomes high.

Figure 3A:
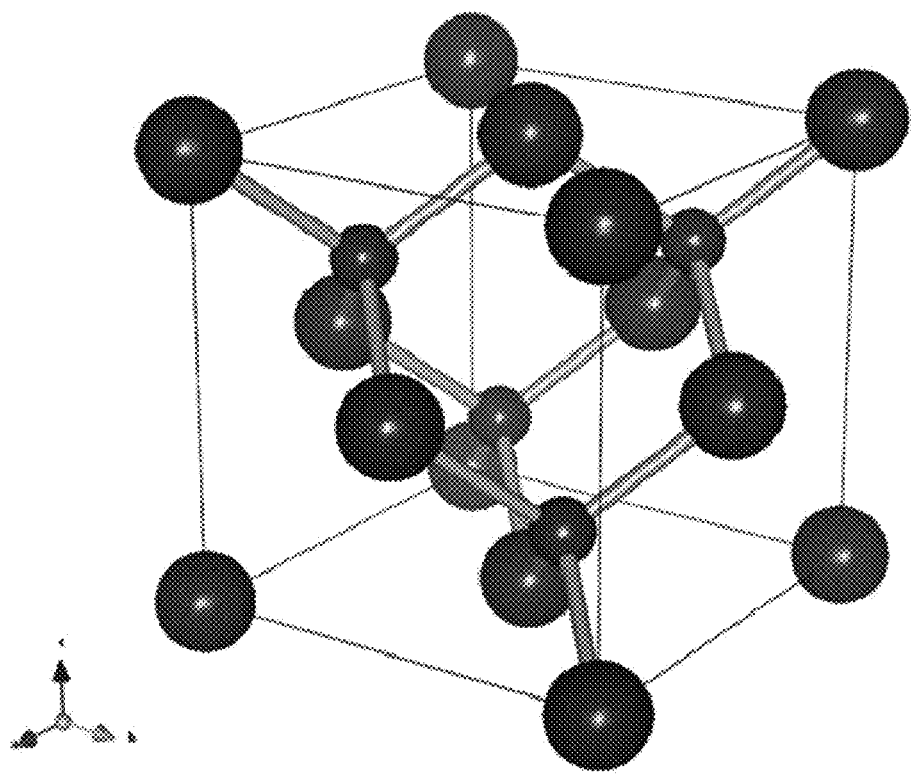
FIG. 3A is a diagram illustrating a silicon crystal structure.

In the meantime, FIG. 3A is a diagram illustrating a silicon crystal structure for describing the aforementioned feature in more detail.

A lattice parameter of silicon, $a_{Si}$, is 5.431 Å ($a_{Si}$=5.431 Å). In the meantime, when a lattice mismatch ratio is 20% or lower, a range of the lattice parameter of a matrix having the simple cubic structure for suppressing expansion or dispersal may be calculated as described below.

$$a_{Matrix\_cubic}=\frac{1}{2}(a_{Si}\pm 20\%)=2.172\sim 3.259 \text{ Å}$$

$$a_{Matrix\_cubic}=a_{Si}\pm 20\%=4.345\sim 6.517 \text{ Å}$$

$$a_{Matrix\_cubic}=2(a_{Si}\pm 20\%)=8.690\sim 13.03 \text{ Å}$$

In the meantime, the most preferred range a of the matrix may be obtained when a lattice mismatch ratio is 10% or lower, and be calculated as described below.

$$a_{Matrix\_cubic}=\frac{1}{2}(a_{Si}\pm 10\%)=2.444\sim 2.987 \text{ Å}$$

$$a_{Matrix\_cubic}=a_{Si}\pm 10\%=4.888\sim 5.974 \text{ Å}$$

$$a_{Matrix\_cubic}=2(a_{Si}\pm 10\%)=9.776\sim 11.948 \text{ Å}$$

In the meantime, lattice mismatch ratios are organized and represented in Table 1 below.

TABLE 1

| Lattice mismatch | Center value of $a_{Matrix\_cubic}$ | | Minimum | Maximum |
|---|---|---|---|---|
| 10% | 0.5 | $a_{Si}$ | 2.716 | 2.444 | 2.987 |
|  |  | $a_{Si}$ | 5.431 | 4.888 | 5.974 |

TABLE 1-continued

| Lattice mismatch | Center value of $a_{Matrix\_cubic}$ | | Minimum | Maximum |
|---|---|---|---|---|
|  | 2 | $a_{Si}$ | 10.862 | 9.776 | 11.948 |
|  | 3 | $a_{Si}$ | 16.293 | 14.664 | 17.922 |
| 20% | 0.5 | $a_{Si}$ | 2.716 | 2.172 | 3.259 |
|  |  | $a_{Si}$ | 5.431 | 4.345 | 6.517 |
|  | 2 | $a_{Si}$ | 10.862 | 8.690 | 13.034 |
|  | 3 | $a_{Si}$ | 16.293 | 13.034 | 19.552 |

In the HCP structure, a lattice parameter may be $\sqrt{2}/2$ times of the lattice parameter of the simple cubic structure represented in Table 1.

$$a_{Matrix\_HCP}=\sqrt{2}/2 * a_{Matrix\_cubic}$$

$$\frac{c_{Matrix\_HCP}}{a_{Matrix\_HCP}}=\sqrt{\frac{8}{3}}(1\pm 0.1)=1.470\sim 1.796$$

In the meantime, FIG. 3B is a tissue picture of a nano grain matrix layer formed on an interface between a silicon layer and an amorphous matrix layer according to the embodiment of the present invention. A picture illustrated in FIG. 3B is a High Resolution Transmission Electron Microscopy (HRTEM) image at a point, at which three regions of a nano grain matrix layer formed on a silicon layer, an amorphous matrix layer, and an interface between the silicon layer and the amorphous matrix layer. At least one among the three regions in a negative electrode active material, in which only two phases of a silicon phase and a matrix phase exist, represents a silicon crystal phase, and further at least another one represents a matrix phase. It can be seen that all of the three regions represent a moiré pattern unique to a crystalline structure. Accordingly, it can be confirmed that the matrix is amorphized based on an X-ray Diffraction (XRD) phase, but as a result of the confirmation based on the HRTEM image, it can be seen that the nano grain matrix layer is formed.

FIGS. 4A to 4D are schematic diagrams illustrating a form of an interface according to a lattice mismatch ratio of a matrix to silicon.

First, FIG. 4A illustrates a state where when a lattice mismatch ratio is 10%, a semi-coherent interface is formed between a silicon crystal lattice and a matrix crystal lattice. It can be seen that when a lattice mismatch ratio of a matrix to silicon has a range equal to or smaller than 10%, a dispersal phenomenon of the negative electrode active material is most suppressed. When the lattice mismatch ratio is 10% or smaller, dislocation is generated every about 10 lattices, so that a defectless coherent interface at a level of about 5 nm continues. In this case, compared to the case where the lattice mismatch ratio is 20%, a coherent interface or a semi-coherent interface may be easily generated, so that this feature is advantageous to a preparing process of the negative electrode active material, and a possibility in that nano grains compactly exist on a surface of the silicon crystal becomes high.

FIG. 4B illustrates a state where when a lattice mismatch ratio is 20%, a semi-coherent interface is formed between a silicon crystal lattice and a matrix crystal lattice. When a lattice mismatch between the silicon and the matrix has a range of 20% or lower, a dispersal phenomenon of the negative electrode active material is suppressed.

However, when a lattice mismatch ratio is 30% as illustrated in FIG. 4C, that is, a lattice mismatch ratio exceeds 20%, it is difficult to form a coherent or semi-coherent interface between the silicon crystal lattice and the matrix crystal lattice, and even though the silicon crystal lattice and the matrix crystal lattice are partially coherent, interfacial energy is increased, so that it is difficult to expect an effect of suppressing a dispersal phenomenon of the negative electrode active material.

FIG. 4D is a schematic diagram illustrating a case where a constant of a crystal lattice (lattice parameter) of the matrix material is similar to ½ times or an integer multiple of a crystal lattice of the silicon crystal. In this case, a similar interfacial decrease effect is exhibited, and dispersal of the negative electrode active material is suppressed, so that a crack phenomenon and an electrolyte permeation phenomenon are not generated well.

[Silicon-Based Negative Electrode Active Material Including a Three-Layer Structure]

FIG. 1A is a schematic diagram illustrating an existing silicon-based negative electrode active material, and FIG. 1B is a schematic diagram illustrating a state in which silicon and a matrix material form an inherent interface in FIG. 1A, and a tissue cross-sectional picture after charging/discharging with 50 cycles.

In the meantime, FIG. 2A is a schematic diagram illustrating a three-layer structure of a silicon-based negative electrode active material according to an embodiment of the present invention, and FIG. 2B is a schematic diagram illustrating a state in which silicon and a matrix material form a coherent interface or a semi-coherent interface in FIG. 2A and a tissue cross-sectional picture after charging/discharging with 50 cycles.

As illustrated in FIGS. 1A and 1B, in an existing silicon-based negative electrode active material, a crystalline matrix material surrounds around a silicon material. However, the crystalline matrix forms an inherent interface with the silicon, so that interfacial energy is high, thereby failing to suppress expansion or dispersal of the silicon combined with lithium. A bright region in the cross-sectional picture of FIG. 1B is a matrix portion, and shows a state in which an interface between a silicon layer and a matrix layer is not maintained, a volume of the silicon region is increased, so that the silicon regions are connected with each other, and the matrix region is split and dispersed.

By contrast, a negative electrode active material for a secondary battery according to an embodiment of the present invention illustrated in FIGS. 2A and 2B has a three-layer structure including a silicon layer, an amorphous matrix layer outside the silicon layer, and a nano grain matrix layer formed on an interface between the silicon layer and the amorphous matrix layer. The aforementioned negative electrode active material having the three-layer structure exhibits a clear difference from the structure of the negative electrode active material illustrated in FIGS. 1A and 1B, and has a structure capable of remarkably suppressing expansion or dispersal of silicon combined with lithium. In the embodiment of the present invention, the silicon layer is a crystalline phase positioned at a core, and a constant of a width of a crystalline region has a size of 10 nm to 200 nm when a cross-section is observed, and the silicon layer has a structure in which the crystalline regions are three-dimensionally connected to continue to a surface of the alloy. When the silicon crystalline layer is isolated, lithium cannot enter the silicon crystalline layer during charging/discharging of the secondary battery, so that the silicon crystalline layer is substantially and three-dimensionally connected up to the surface of the alloy. Accordingly, a path, through which the lithium may enter the silicon crystalline layer, during charging/discharging is secured.

Further, the amorphous matrix layer exists outside the silicon layer, and the nano train matrix layer covers the interface between the silicon layer and the amorphous matrix layer.

Further, the interface between the silicon layer and the amorphous matrix layer may form a coherent or semi-coherent interface. Further, as long as a material has a stable phase, which does not react to lithium, or partially reacts to lithium together with silicon, the material may be acceptable as the matrix layer.

In the negative electrode active material having the three-layer structure according to the embodiment of the present invention, expansion of the silicon layer combined with lithium during charging/discharging is remarkably excellent by the nano-grain matrix layer covering the interface between the silicon layer and the amorphous matrix layer, compared to the existing silicon-based negative electrode active material.

[Preparing Method of Silicon-Based Negative Electrode Active Material Having Three-Layer Structure]

A method of preparing a silicon-based negative electrode active material including a three-layer structure according to an embodiment of the present invention includes: crystallizing a silicon layer by melting a first operation of melting silicon and a matrix material together and then performing cooling process on the melted silicon and matrix material; a second operation of crystallizing the matrix material to a crystalline nano grain matrix layer on the crystallized silicon layer; and a third operation of forming an amorphous matrix on a surface of the crystalline nano grain matrix layer.

A rapid solidification method may be used as the cooling processing in the first operation. A mass percentage (wt %) of the silicon melted together with the matrix material in the first operation may be 20 wt % to 90 wt %. Further, when the molten silicon and matrix material are cooled in the first operation, it is necessary to adjust a composition ratio of the matrix material to the silicon, so that the silicon is first crystallized.

In the second operation, the crystallization (nano grain) of the matrix is performed on a surface of the cooled solid silicon. In this case, the crystalline nano grain matrix layer starts to be crystallized at a terrace, a ledge, and a kink on an exposed surface of the silicon crystal, and the matrix grows in a direction of decreasing interfacial energy.

In this case, a difference in a lattice parameter between the silicon and the matrix material may be within 20%, which is small. When the difference in a lattice parameter is small, the matrix may grow while forming a coherent or semi-coherent interface with the silicon (Si).

Next, in the third operation, the amorphous matrix layer is formed on the crystalline nano grain matrix layer through an appropriate rapid solidification process. The interface between the silicon layer and the crystalline nano grain matrix layer has very excellent bonding force, thereby suppressing a crack phenomenon, an electrolyte permeation phenomenon, an active material dispersal phenomenon, and the like.

In the meantime, for the negative electrode active material according to the embodiment of the present invention, a mechanical alloy method may be used. The mechanical alloy method is a method of mixing two or more types of powder together and mechanically alloying the mixed powder through ball milling, in which two types of powder are gradually grinded and re-combined, and alloyed while repeatedly receiving an impact by a fall of a ball. The mechanical alloy method enables a raw material to be alloyed without heating and melting the raw material at a high temperature, so that even though materials have two states which cannot coexist according to a phase diagram, the materials may be mutually alloyed. In the mechanical alloy method, a silicon solid mass or powder and a matrix material are mixed and put into a vessel, and in this case, a size of each powder and a size of a ceramic ball are appropriately adjusted. When the mechanical alloy method is used as described above, a width of a material selection is wide, and a micro tissue may be obtained, compared to the rapid solidification method, so that the negative electrode active material having the three-layer structure of the present invention may be prepared.

That is, in the present invention, a size of each powder and a size of a ceramic ball are appropriately adjusted in the operation of mixing the silicon crystalline powder and the matrix powder and then putting the mixture into a vessel to make the silicon crystalline powder and the matrix powder be well alloyed. Next, a break and cohesion of the silicon and the matrix powder are repeated by mechanical collision between the silicon powder and the matrix powder through the ball milling. A silicon particle may maintain a crystalline phase having a size of 10 nm to 200 nm and the matrix phase may be amorphized, thereby preparing a negative electrode active material having a three-layer structure including a silicon, an amorphous matrix layer outside the silicon layer, and a nano grain matrix layer formed on an interface between the silicon layer and the amorphous matrix layer.

The present invention may provide a method of preparing a negative electrode active material for a secondary battery, in which the negative electrode active material is prepared by using a material, in which a lattice mismatch ratio of the matrix material in a crystalline state to the silicon crystal is within 20%, by the mechanical alloy method of mixing silicon crystalline powder and matrix powder and alloying the silicon crystalline powder and the matrix powder through ball milling, and has a three-layer structure including a silicon layer, an amorphous matrix layer outside the silicon layer, and a nano grain matrix layer formed on an interface between the silicon layer and the amorphous matrix layer, and the matrix layer form a coherent or semi-coherent interface with the silicon layer.

In the meantime, in the mechanical alloy method, an alloy progresses while the silicon powder and the matrix powder are repeatedly broken and cohered by mechanical impact between the silicon powder and the matrix powder, the silicon particle maintains a crystal phase with a size of 10 nm to 200 nm, and the matrix phase is amorphized, so that a unique three-layer structure may be created.

[XRD Peak in Silicon-Based Negative Electrode Active Material Having Three-Layer Structure]

In the meantime, FIG. 5A is a diagram illustrating an XRD peak characteristic on a silicon phase and a matrix phase in the embodiment of the present invention.

As described above, the negative electrode active material for a secondary battery according to the embodiment of the present invention has a three-layer structure including a silicon layer, an amorphous matrix layer outside the silicon layer, and a nano grain matrix layer formed on an interface between the silicon layer and the amorphous matrix layer. The aforementioned negative electrode active material having the three-layer structure exhibits a clear difference from the structure of the negative electrode active material, and has a structure capable of remarkably suppressing expansion or dispersal of silicon combined with lithium. As described above, in the embodiment of the present invention, the matrix phase exhibits a smaller XRD peak compared to the silicon phase that is a crystalline structure. Accordingly, $I_{Si}/I_{matrix}>1$. By contrast, when a peak of the silicon phase is smaller than a peak of the matrix, a capacity of the secondary battery is very small, and a life characteristic of the secondary battery is not good.

In the embodiment of the present invention, an XRD peak is regulated as represented below.

$I_{Si}$: A maximum intensity value among XRD peaks of Si phase $I_{matrix}$: A maximum intensity value among XRD peaks of matrix phase Referring to FIG. 5, for A11, A12, and A13, and when an amorphization degree of the matrix of crystalline matrixes A14 and A15 is increased, $I_{Si} \gg I_{matrix}$, so that $I_{Si}/I_{matrix}>1$ may be obtained.

In the meantime, FIG. 5B is a diagram illustrating an XRD peak pattern in a case of slow cooling and a case of fast cooling according to the embodiment of the present invention.

In the case of the slow cooling, a crystalline matrix phase having the FCC structure with 5.8% of a lattice mismatch ratio is observed, but when the same material is rapidly cooled, a considerable part of the matrix phase is amorphized, and a phenomenon, in which the peaks are widely distributed and spread to mutually overlap, is shown.

Further, FIG. 5C illustrates a TEM diffraction pattern of a slowly cooled negative electrode active material matrix according to the embodiment of the present invention. Referring to the tissue picture, a crystal structure, in which 3 fold and 4 fold coexist is a cubic structure, and it can be seen that the crystal structure is the FCC structure when is analyzed together with an XRD result.

[Amorphization Degree and Expansion Rate Characteristic of Silicon-Based Negative Electrode Active Material]

In the meantime, for the negative electrode active material used in the embodiment of the present invention, a size of an expansion rate after 50 cycles is investigated according to a composition of a metal compound for a negative electrode active material used in the embodiment of the present invention to draw a range of an optimum expansion rate according to a change in composition.

In the meantime, in the embodiment of the present invention, a fine crystalline region exists on a matrix of an alloy, thereby making lithium be more easily dispersed. Further, a rate of the existence of the fine crystalline region may be represented by an amorphization degree, and the amorphous region is formed on the matrix, so that a volume expansion while charging the secondary battery may be suppressed.

In the present invention, an amorphization degree of a silicon alloy has a value of 25% or more. However, in the present invention, silicon is substantially crystalline, so that an amorphization degree of the entire silicon alloy does not exceed 65%. When the amorphization degree is formed within the range, lithium is very easily dispersed. Further, it can be seen that an expansion rate after 50 cycles is also excellently exhibited within the aforementioned range of the amorphous degree, and thus, when the silicon alloy is used as the negative electrode active material, volume expansion during charging is suppressed.

In the embodiment of the present invention, an amorphization degree may be 25% to 65% when an XRD pattern rotation angle 2θ of the alloy is 20° to 100°. Within the range of the amorphization degree, the volume expansion is suppressed, so that electric insulation is generated well.

A calculation of an amorphization degree used in the present invention is represented below, and an amorphization degree may be calculated as illustrated in FIG. 6.

Amorphization degree (%)=((entire area−crystallization area))÷entire area)×100 (5)

In the embodiment of the present invention, a high amorphization degree means that there are many fine crystalline regions, and thus, lithium ions may be accumulated through a buffering action in the fine crystalline regions during the charging, thereby suppressing a volume expansion factor.

Further, in the embodiment of the present invention, an expansion rate after 50 cycles has a range of 70 to 150%, and a negative electrode active material for a secondary battery formed by an equation below is provided.

$$Si_xTi_yFe_zAl_u \quad (1)$$

(x, y, z, and u are atom % (at %), x: 1−(y+z+u), y: 0.09 to 0.14, z: 0.09 to 0.14, and u: larger than 0.01 and less than 0.2)

In the present embodiment, Si has a range of 60 to 70% and Ti and Fe have a range of 9 to 14% based on at %. In the meantime, the Al has a range larger than 1% and less than 20%, and particularly, a range of 5 to 19%.

Ti and Fe included in the alloy are combined with Si to form an intermetallic compound of $Si_2TiFe$. Accordingly, when contents of each of Ti and Fe are 14 at %, 28 at % or more of Si is consumed for forming the intermetallic compound, so that a capacity per g of the active material is decreased, and in this case, in order to obtain a capacity of 1,000 mAh/g or more, the contents of Si inserted need to be considerably increased.

In general, when a large amount of Si that is a semimetal is contained, viscosity of a molten metal is high during melting, and thus rapid solidification workability becomes poor, so that the contents of Si are maintained within a range of 70% if possible, and thus, the contents of Ti and Fe do not exceed 14%. In the embodiment of the present invention, it has been drawn that the contents of Ti and Fe may be decreased to 14% or lower during a process of drawing an optimum alloy component in relation to the expansion rate.

Further, Al may have a range larger than 1% and less than 20% based on at %. When about 1% of Al is contained, expansion is violently incurred after 50 cycles, and the active material is dispersed, so that about 1% of Al is not desirable. Further, when Al is 20%, a discharge capacity by a volume fraction change in Si:Matrix is decreased, so that about 20% of Al is not desirable. In the embodiment of the present invention, it was drawn that when Al has a range of 5 to 19%, the negative electrode active material has the most preferred expansion rate range, and it could be seen that a discharge capacity is not decreased within the range. Most particularly, Al may be in the range of 10 to 19%, and it is possible to obtain the most preferred 50 cycle expansion rate range within the range, and further, a discharge capacity is not decreased.

Further, the method of preparing the negative electrode active material of the present invention is not particularly limited, and includes the aforementioned mechanically alloy method. Further, for example, various fine powder preparing methods (a gas atomizer method, a centrifugal gas atomizer method, a plasma atomizer method, a rotating electrode method, and a mechanical alloy method) publicly known in the art may be used. In the present invention, for example, an active material may be prepared by mixing components of Si and a matrix, melting a mixture by an arc melting method and the like, and applying a single roll rapid solidification method of injecting the melted material into a rotating copper roll. However, the method applied to the present invention is not limited to the aforementioned method, and the active material may be prepared by the aforementioned suggested fine powder preparing method (a gas atomizer method, a centrifugal gas atomizer method, a plasma atomizer method, a rotating electrode method, and a mechanical alloy method) as long as the method is capable of obtaining a sufficient fast cooling speed, other than the single roll rapid solidification method.

[Manufacturing Method of Secondary Battery]

Further, a secondary battery may be manufactured by using the negative electrode active material according to the embodiment of the present invention, and a lithiated intercalation compound may be included as a positive electrode in the secondary battery, and in addition, inorganic sulfur (S8, elemental sulfur) and a sulfur-based compound may also be used, and examples of the sulfur-based compound include $Li_2S_n$ (n≥1), $Li_2S_n$ (n≥1) dissolved in catholyte, an organic sulfur compound, or a carbon-sulfur compound ($(C_2Sf)_n$: f=2.5 to 50, n≥2).

Further, the kind of electrolyte included in the secondary battery of the present invention is not particularly limited, and a general means publicly known in the art may be adopted. In one example of the present invention, the electrolyte may include a nonaqueous organic solvent and lithium salt. The lithium salt may be dissolved in the organic solvent to act as a lithium ion supply source within the battery, and facilitate a movement of lithium ions between a positive electrode and a negative electrode. Examples of lithium salt usable in the present invention may include supporting electrolytic salt including one or two or more of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y-1}SO_2)$ (here, x and y are natural numbers), LiCl, LiI, and lithium bisoxalate borate. A concentration of the lithium salt in the electrolyte may be varied according to a usage, and is generally in a range of 0.1 M to 2.0 M.

Further, the organic solvent serves as a medium for making ions involving in an electrochemical reaction of the battery move, and an example thereof includes one or more of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (here, R is a hydrocarbon group having a linear, branched, or ring structure with 2 to 50 carbon atoms, and the hydrocarbon group may include double bonding, aromatic ring, or ether bonding), dimethylformamide, dimethylacetate, xylene, cyclohexane, tetrahydrofuran, 2-methyltetrahydrofuran, cyclohexanone, ethanol, isopropyl alcohol, dimethyl carbonate, ethyl methyl carbonate, diethyl carbonate, methyl propyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, and mevalerolactone, but is not limited thereto.

The secondary battery of the present invention may further include a typical element, such as a separator, a can, a battery case, or a gasket, in addition to the aforementioned elements, and a particular kind of the element is not particularly limited. Further, the secondary battery of the present invention may include the aforementioned elements and be manufactured by a method and in a shape general in the art. An example of the shape of the secondary battery of the present invention includes a cylindrical shape, a horn shape, a coin shape, or a pouch shape, but the shape thereof is not limited thereto.

Hereinafter, the present invention will be described in more detail through the Examples.

Experimental Example 1: Expansion Characteristic of the Negative Electrode Active Material Having the Three-Layer Structure Used in the Embodiment of the Present Invention In the present embodiment, Si has a range of 60 to 70% and Ti and Fe have a range of 9 to 14% based on at %. In the meantime, the Al has a range larger than 1% and less than 20%, and preferably, a range of 5 to 19%. Most particularly, the Al has a range of 10 to 19%.

Table 2 is a table illustrating a composition range of the Example and a Comparative Example. In the meantime, Table 2 below relates to an evaluation of a silicon-based negative electrode active material based on the compositions of Table 2, and particularly, represents a 1CY-charge/discharge quantity, 1CY-efficiency, a 1CY-electrode plate capacity, a 50CY-discharge capacity, 50CY-efficiency, a 50CY-capacity maintenance rate, a 50CY-expansion rate, and an amorphization degree (%) of the Examples and the Comparative Examples. A technical meaning for each item of Table 3 will be described in detail below.

In the silicon-based negative electrode active material used in the embodiment of the present invention, the items were measured by repeating charge/discharge 50 times. The charging/discharging method was performed based on a charging/discharging method for an active material for a lithium secondary battery which is generally and publicly known in the art.

First, in Examples 1 to 5 of the present invention, Al is composed within a range of 5 to 19% based on at %, and Comparative Example 1 represents a case where Al is not added, and Comparative Example 2 represents a case where Al is added by 1%. Comparative Example 3 represents a case where Al is added by 20%.

In the meantime, Ti and Fe are bonded to Si to form $Si_2TiFe$ that is an intermetallic compound. Accordingly, when the contents of Ti and Fe are large, Ti and Fe are consumed for forming the intermetallic compound with Si, so that a capacity of Si per g of an active material is decreased, and in this case, in order to obtain Si with a capacity of 1,000 mAh/g or more, the contents of Si inserted need to be considerably increased. In general, when a large amount of Si that is a semimetal is contained, viscosity of a molten metal is high during melting, and thus rapid solidification workability becomes poor, so that the contents of Si may be maintained within a range of 70% if possible. Accordingly, the contents of Ti and Fe may not exceed 14% considering the forming of the intermetallic compound with Si.

Referring to Tables 2 and 3 below, it was drawn that it is preferable to decrease the contents of Ti and Fe to 14% or less during a process of drawing an optimum alloy component in relation to an expansion rate.

Further, Al may have a range larger than 1% and less than 20% based on at %. When about 1% of Al is contained, expansion considerably occurs after 50 cycles, and in this case, the active material is dispersed. Further, when 20% of Al is included, a discharge capacity by a change in a volume fraction of Si:matrix is sharply decreased, so that 20% of Al is not preferable. In the Examples of the present invention, it was drawn that when Al has a range of 5 to 19% based on at %, the negative electrode active material may have the most preferable expansion rate, and it could be seen that a discharge capacity is not decreased within the range of 5 to 19%. Most particularly, Al is in the range of 10 to 19%, and it is possible to obtain the most preferred 50 cycle expansion rate range, and further a discharge capacity is not decreased.

Referring to Table 3 below, in Examples 1 to 5 of the present invention, it can be seen that performance of the active material is improved according to the addition of Al. Particularly, it can be seen that when Al is added, a discharge capacity, reversible efficiency, and an expansion characteristic are remarkably improved. By contract, in Comparative Example 1, in which Al is not added, a 50 cycle expansion characteristic has a value exceeding 200%. Further, in Comparative Example 2 in which Al is added by 1%, a 50 cycle expansion characteristic exceeds 200% similar to Comparative Example 1. By contrast, in Comparative Example 3 in which Al is added by 20%, a 50 cycle expansion characteristic is 40.2%, which is very low, but in this case, a discharge capacity is remarkably decreased, so that there is a problem in that an effect of performance improvement of the negative electrode active material of a secondary battery is rather decreased.

Accordingly, referring to Tables 2 and 3, it can be seen that a discharge capacity, reversible efficiency, and an expansion characteristic of the negative electrode active material are remarkably improved according to the addition of AL. Further, it can be seen that when the added amount of Al exceeds at least 1%, but is less than 20% based on at %, optimum performance is exhibited. Further, it can be seen that in Comparative Examples 1 and 2, an amorphization degree (%) is less than 25%, and thus, it can be seen that in the Examples of the present invention, a preferable amorphization degree within the component range of Al is at least 25% or more.

TABLE 2

| Classification | Si (at %) | Ti (at %) | Fe (at %) | Al (at %) |
| --- | --- | --- | --- | --- |
| Comparative Example 1 | 70 | 15 | 15 | 0 |
| Comparative Example 2 | 70 | 14.5 | 14.5 | 1 |
| Example 1 | 70 | 12.5 | 12.5 | 5 |
| Example 2 | 70 | 11.5 | 11.5 | 7 |
| Example 3 | 70 | 10 | 10 | 10 |
| Example 4 | 68 | 9 | 9 | 14 |
| Example 5 | 65 | 10 | 10 | 15 |
| Comparative Example 3 | 60 | 10 | 10 | 20 |

TABLE 3

| Classification | 1 CY-charge | 1 CY-discharge | 1 CY-efficiency | 1 CY-Electrode plate | 50 CY-discharge | 50 CY-efficiency | 50 CY-maintenance | 50 CY-expansion | Amorphization degree (%) |
|---|---|---|---|---|---|---|---|---|---|
| Comparative Example 1 | 1134.0 | 924.2 | 81.5% | 800.4 | 871.2 | 98.4% | 101.6% | 210.0% | 24.5 |
| Comparative Example 2 | 1277.2 | 1072.3 | 83.9% | 928.6 | 1012.1 | 98.8% | 96.1% | 208.3% | 24.7 |
| Example 1 | 1299.9 | 1085.2 | 83.5% | 939.8 | 948.7 | 99.1% | 91.8% | 147.9% | 29.2 |
| Example 2 | 1405.6 | 1212.5 | 86.3% | 1050.0 | 1125.1 | 99.5% | 97.1% | 96.2% | 41.1 |
| Example 3 | 1336.5 | 1133.2 | 84.7% | 981.3 | 1038.7 | 99.3% | 97.2% | 120.0% | 45.5 |
| Example 4 | 1752.3 | 1535.8 | 87.6% | 1330.0 | 1216.5 | 99.3% | 88.7% | 93.8% | 35.1 |
| Example 5 | 1189.4 | 988.0 | 83.0% | 855.6 | 977.2 | 100.5% | 113.2% | 78.1% | 45.3 |
| Comparative Example 3 | 614.2 | 432.8 | 70.3% | 374.8 | 597.7 | 100.5% | 164.1% | 40.2% | 46.5 |

First, the silicon-based negative electrode active material used in the Examples of the present invention was evaluated by manufacturing an electrode plate having a composition below.

A silicon alloy active material was evaluated by manufacturing an electrode plate having a composition in which a ratio of a conductive addictive (based on a carbon black) and a binder (based on an organic material, a PAI binder) is 86.6%:3.4%:10%, and slurry dispersed in an NMP solvent was prepared, the slurry was coated on a copper foiled current collector by a doctor blade method, followed by drying in a microwave oven at 110° C. and heat treating for one hour at an Ar atmosphere at 210° C., to cure the binder.

The electrode plate manufactured by the aforementioned method was assembled to a coin cell by using a lithium metal as a counter electrode, followed by being subject to a formation process under the condition below.

Charge (lithium insertion): 0.1C, 0.005V, 0.05C cut-off
Discharge (lithium discharge): 0.1C, 1.5V cut-off After the formation process, a cycle test was performed under the condition below.

Charge: 0.5C, 0.01V, 0.05C cut-off
Discharge: 0.5C, 1.0V cut-off

In Table 3, 1CY-charge (mAh/g) is a formation charge capacity per 1 g of an active material, and is a value obtained by measuring a charge quantity at a charging stage that is the first charge stage in the formation process after assembling the coin cell and dividing the measured charge quantity by weight of the active material included in the electrode plate of the coil cell.

1CY-discharge (mAh/g) is a formation discharge capacity per 1 g of the active material, and is a value obtained by measuring a charge quantity at a discharging stage that is the first charging stage in the formation process after assembling the coin cell and dividing the measured charge quantity by weight of the active material included in the electrode plate of the coin cell. In the present Example, a capacity per g of the active material means a 0.1C formation discharge capacity that is the discharge capacity measured in this case.

1CY-efficiency is a value obtained by dividing a discharge capacity in the formation process that is the first charge/discharge process by a charge capacity and expressed by a percentage. In general, graphite has high initial efficiency of 94%, a silicon alloy has initial efficiency of 80 to 90%, and a silicon oxide (SiOx) has initial efficiency of a maximum of 70%.

Any kind of material has initial efficiency of less than 100% because lithium initially inserted during charging in the formation process is irreversibly trapped or consumed by a side reaction, such as formation of an SEI, and when initial efficiency is low, there is a loss in that a negative electrode active material and a positive active material need to be additionally inserted as much as quantities corresponding to the low initial efficiency, so that high initial efficiency of the active material is important when a battery is designed.

The silicon alloy used in the Example of the present invention has an initial efficiency value of 85%, and the conductive addictive or the binder initially and irreversibly consumes lithium, so that an initial efficiency value of the active material itself is substantially about 90%.

50CY-discharge is a discharge capacity per g of the active material for 50 cycles, and is a value obtained by dividing a charge quantity measured during the discharge at the $50^{th}$ cycle including the formation process during a cycle test performed with 0.5C after the formation process by weight of the active material. When the active material deteriorates during the progress of the cycle test, 50CY-discharge is represented with a numerical value smaller than an initial discharge capacity, and when the active material hardly deteriorates during the progress of the cycle test, 50CY-discharge is represented with a numerical value similar to an initial discharge capacity.

50CY-efficiency is a ratio, expressed by a percentage, of a discharge quantity to a charge quantity at the 50 cycles. High 50CY-efficiency means that a loss of lithium due to a side reaction and other deterioration at a corresponding cycle is small. In general, when the 50CY-efficiency is 99.5% or more, the value is determined to be very excellent, and distribution in the assembling of the coin cell cannot be ignorable according to an environment of an experiment room, so that even when the 50CY-efficiency is 98% or more, the value is determined to be excellent.

50CY-maintenance is a ratio, which is expressed by a percentage, of a discharge capacity at the $50^{th}$ cycle based on a discharge capacity at the first cycle when a next 0.5C cycle is performed except for the cycle performed during the formation process.

When the 50CY-maintenance ratio is large, it is considered that an inclination of a battery lifespan is close to a horizontal line, and when the 50CY-maintenance rate is 90% or less, it means that deterioration is incurred during the progress of the cycle and a discharge capacity is decreased. In some Examples, there are even the cases where the 50CY-maintenance ratio exceeds 100%, and this is determined that deterioration is hardly incurred for the progress of the lifespan, and activated silicon particles are additionally present.

50CY-expansion is a thickness increased value, which is expressed by a percentage, after 50 cycles compared to an initial electrode plate thickness. A method of measuring the 50CY-expansion will be described in detail below.

First, an initial thickness of a current collector is measured.

Then, a thickness of only the active material is calculated by measuring a thickness of an electrode plate, which is cut in a circular shape so as to be assembled to the coin cell, by using a micro meter, and then subtracting the thickness of the current collector from the measured thickness of the electrode plate.

Next, after a 50 cycle test is completed, the coil cell is removed from a dry room, only a negative electrode plate is separated, an electrolyte left on the electrode plate is washed by using a DEC solution and dried, a thickness of the electrode plate is measured by using a micro meter, and a thickness of the current collector is subtracted from the measured thickness of the electrode plate to calculate a thickness of only the active material after the cycle. That is, a value, which is expressed by a percentage, obtained by dividing an increased thickness of the active material after 50 cycles compared to an initial thickness of the active material by the initial thickness of the active material is 50CY-expansion.

Experimental Example 2: Si, Ti, Fe, and Al Alloy

FIG. 7 is a diagram illustrating an XRD pattern about Example 1 of Experimental Example 1 using the alloy of Si, Ti, Fe, and Al as Experimental Example 2. As illustrated in FIG. 7, the XRD pattern of the slowly cooled alloy represents peaks formed of an Si crystal and a matrix phase, and as a result of the TEM diffraction analysis of the matrix phase, the matrix phase represents the FCC structure, a lattice parameter a of the matrix phase is 11.50 Å, and a lattice mismatch ratio of the matrix phase to the silicon is 5.7%. In the meantime, FIG. 8 is a TEM picture of the material about Example 1 of FIG. 7 at the time of the rapid solidification. As illustrate in FIG. 8, referring to the TEM picture of the silicon-based negative electrode active material of the present invention, it can be seen that a silicon layer, an amorphous matrix layer outside the silicon layer, and a nano grain matrix layer formed on an interface between the silicon layer and the amorphous matrix layer are formed in a three-layer structure.

Particularly, investigating FIG. 8 in detail, at a point, at which three phases meet according to a phase diagram, all of the three phases exhibit crystal lattice patterns. That is, one of the three crystalline phases is an Si phases, and at least another one is a matrix phase. As a result of the XRD pattern analysis, the matrix phase is amorphous, but it can be seen through the investigation of the interface through the TEM that a nano grain matrix crystal phase is observed, so that the negative electrode active material has the three-layer structure.

Experimental Example 3: Characteristic of negative electrode active material of $Si_{70}Ti_{15}Fe_{15}$ In the meantime, Experimental Example 3 is a negative electrode active material about $Si_{70}Ti_{15}Fe_{15}$, and the present negative electrode active material does not have a cubic structure and has a crystalline structure. Accordingly, a dispersal is considerably generated after 50 cycles. The reason is determined that a crystal structure of the matrix is different and the matrix itself exhibits a crystalline property.

Figure 9A:
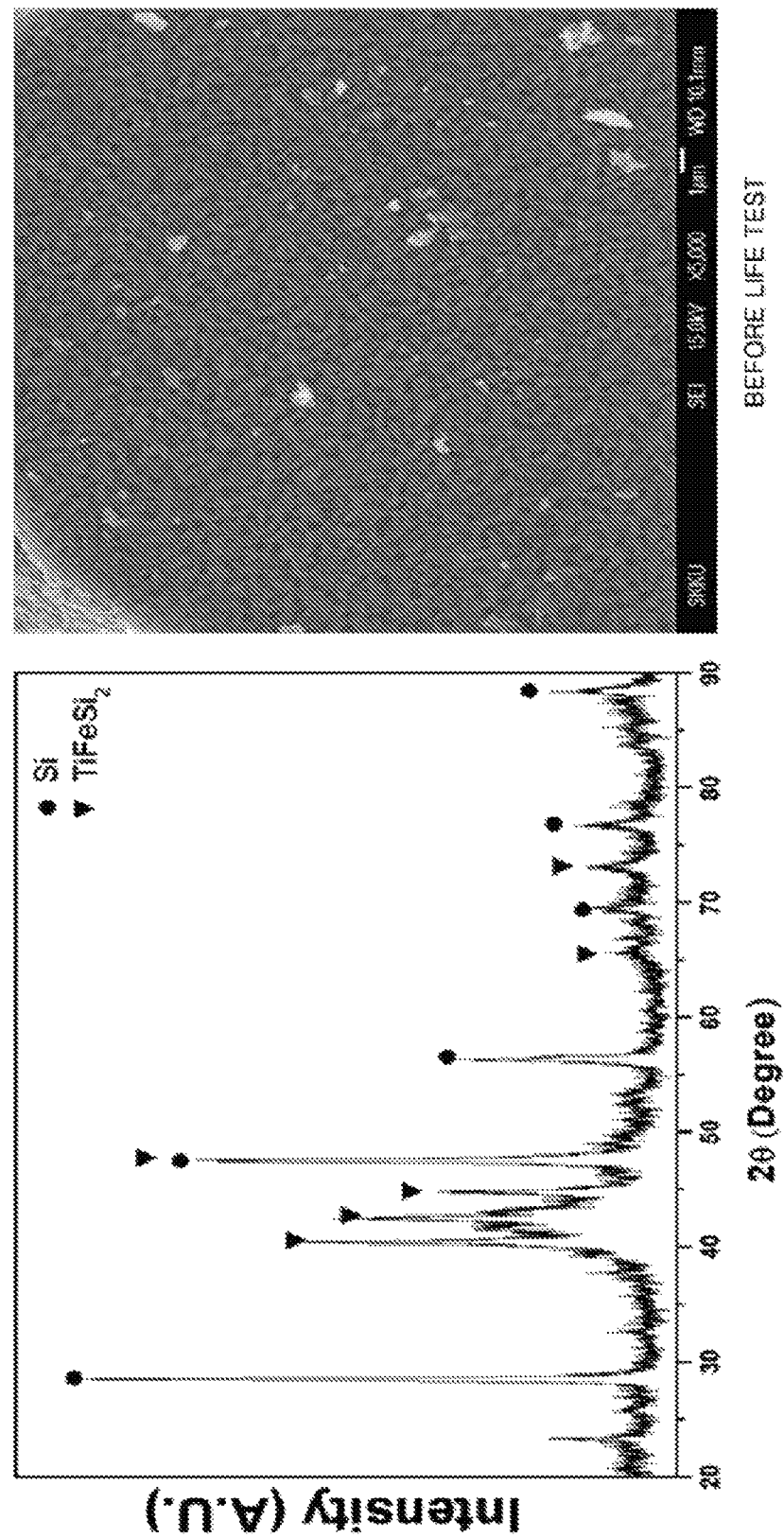
FIG. 9A is a diagram illustrating an XRD peak characteristic and a state before a life test of a negative electrode active material of Example 3.
Figure 9B:
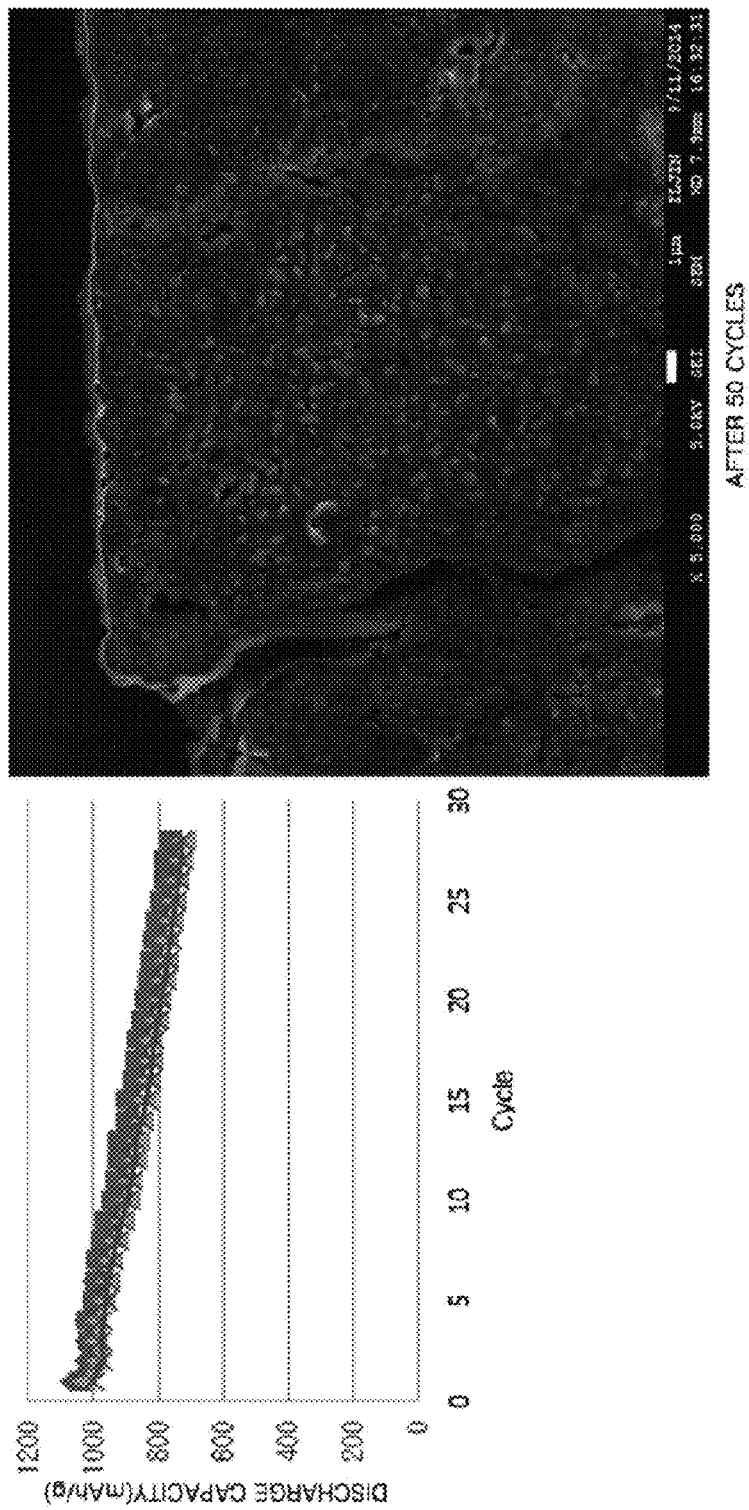
FIG. 9B is a diagram illustrating a state where a discharge capacity is considerably decreased due to a dispersal phenomenon after 50 cycles.

FIG. 9A is a diagram illustrating an XRD peak characteristic and a state before a life test of a negative electrode active material of Experimental Example 3, and FIG. 9B is a diagram illustrating a state where a discharge capacity is considerably decreased due to a dispersal phenomenon after 50 cycles.

According to the XRD peak characteristic illustrated in FIG. 9A, it is shown that $TiFeSi_2$ that is the matrix phase is crystalline, and in FIG. 9B, it is shown well that a discharge capacity is decreased from 1,100 mAh/g to 800 mAh/g or smaller only for 50 cycles while the cycle progresses. Further, in FIGS. 9A and 9B, an SEM picture represents a cross-section of an exploded electrode plate, and a bright region thereof is the matrix, and a dark region thereof is a region in which a Si+Li+electrolyte side reaction product is mixed.

Experimental Example 4: Characteristic of Negative Electrode Active Material of $Si_{60}(Cu_{20}Al_{80})_{30}Fe_5Ti_5$ Experimental Example 4 is a negative electrode active material of $Si_{60}(Cu_{20}Al_{80})_{30}Fe_5Ti_5$, and in the present negative electrode active material, the matrix is amorphous according to the XRD characteristic. However, it is exhibited that a life characteristic is relatively excellent, but a dispersal phenomenon after 50 cycles is also incurred. The reason is that a crystal structure and a lattice parameter of the matrix are considerably different from those of the silicon crystal.

Figure 10A:
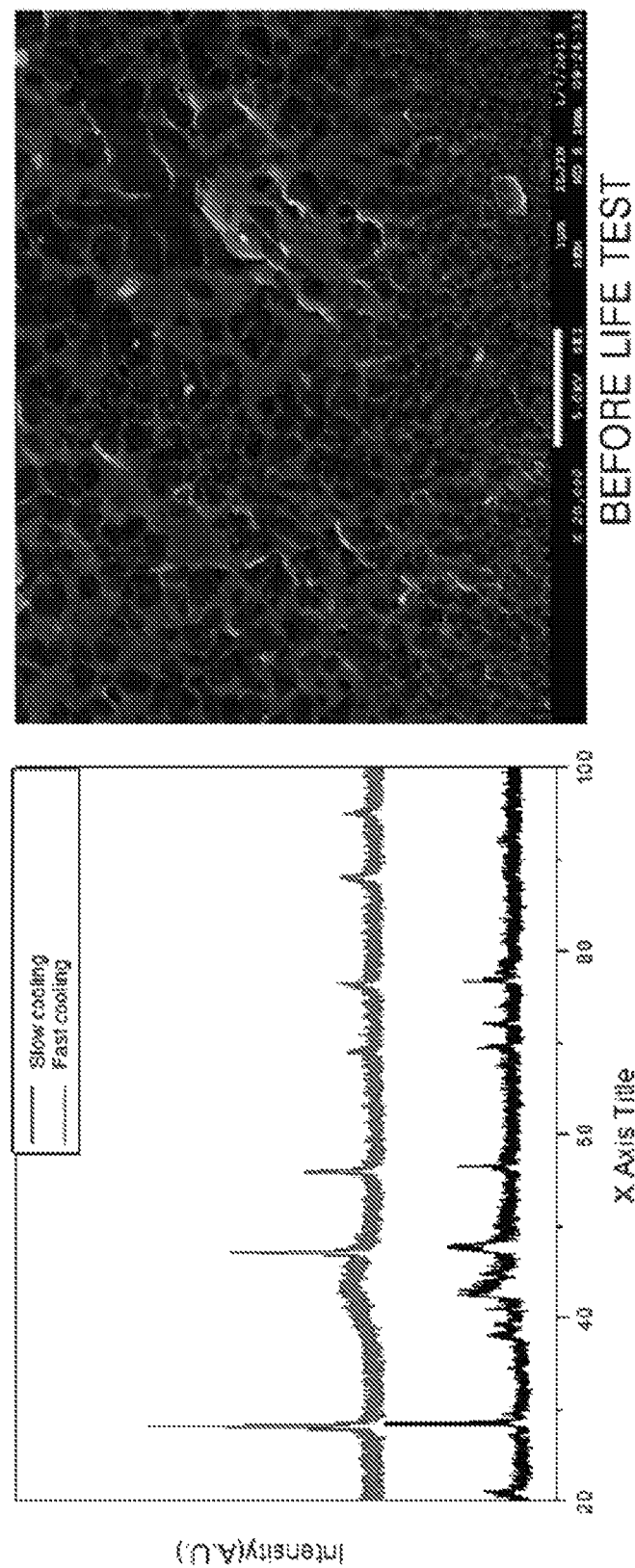
FIG. 10 is a diagram illustrating a case where a capacity is decreased due to a dispersal phenomenon after 50 cycles in Example 4.
Figure 10B:
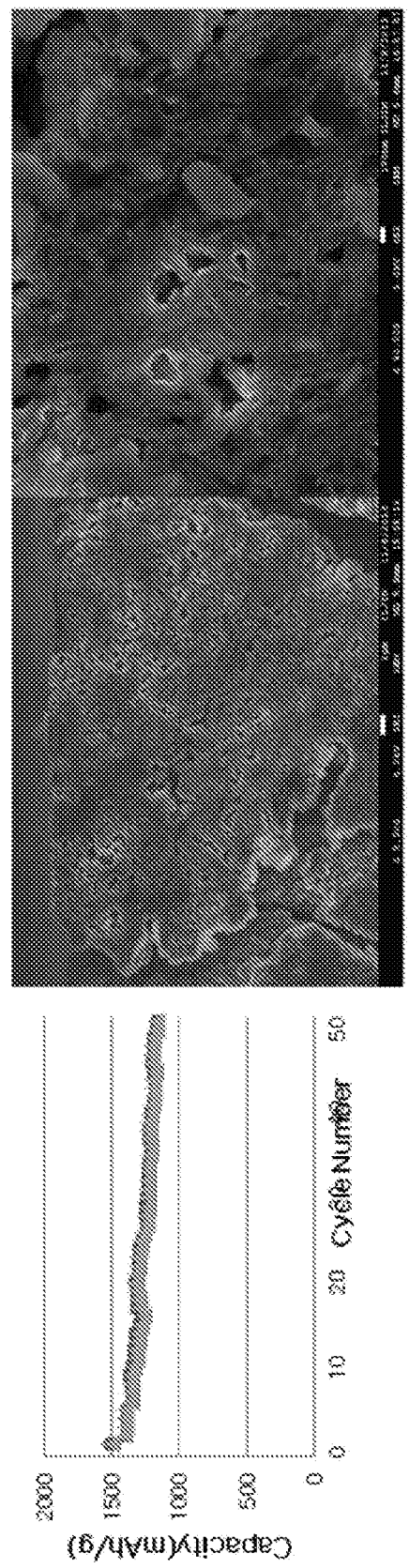

FIG. 10A is a diagram illustrating an XRD peak characteristic and a state before a life test of the negative electrode active material, and illustrates states at the time of the slow cooling and the fast cooling. In the meantime, FIG. 10B illustrates a SEM picture of a cross-section of an electrode plate, in which a side reaction layer material is filled in the interface while the interface between silicon and a matrix is separated after 50 cycles, so that a matrix material is dispersed, and expansion is severe.

Experimental Example 5: Characteristic of Negative Electrode Active Material of $Si_{60}(Cu_{20}Al_{80})_{32.5}Fe_5Zr_{2.5}$ In the meantime, Experimental Example 5 is a negative electrode active material of $Si_{60}(Cu_{20}Al_{80})_{32.5}Fe_5Zr_{2.5}$, and in the present negative electrode active material, the matrix is amorphous according to the XRD characteristic. However, it is exhibited that a life characteristic is relatively excellent, but a dispersal phenomenon after 50 cycles is also incurred. The reason is that a crystal structure and a lattice parameter of the matrix are considerably different from those of the silicon crystal.

Figure 11A:
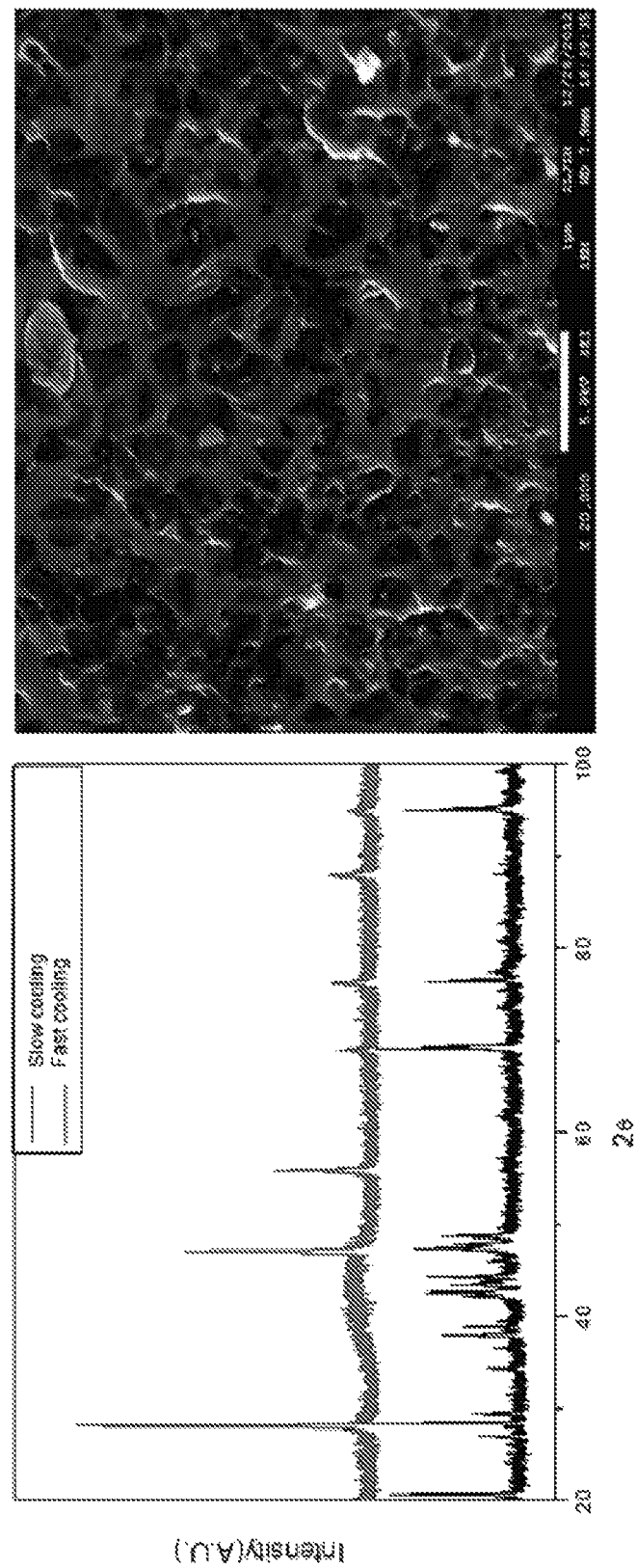
FIG. 11 is a diagram illustrating a case where a capacity is sharply decreased due to a dispersal phenomenon after 50 cycles in Example 5.
Figure 11B:
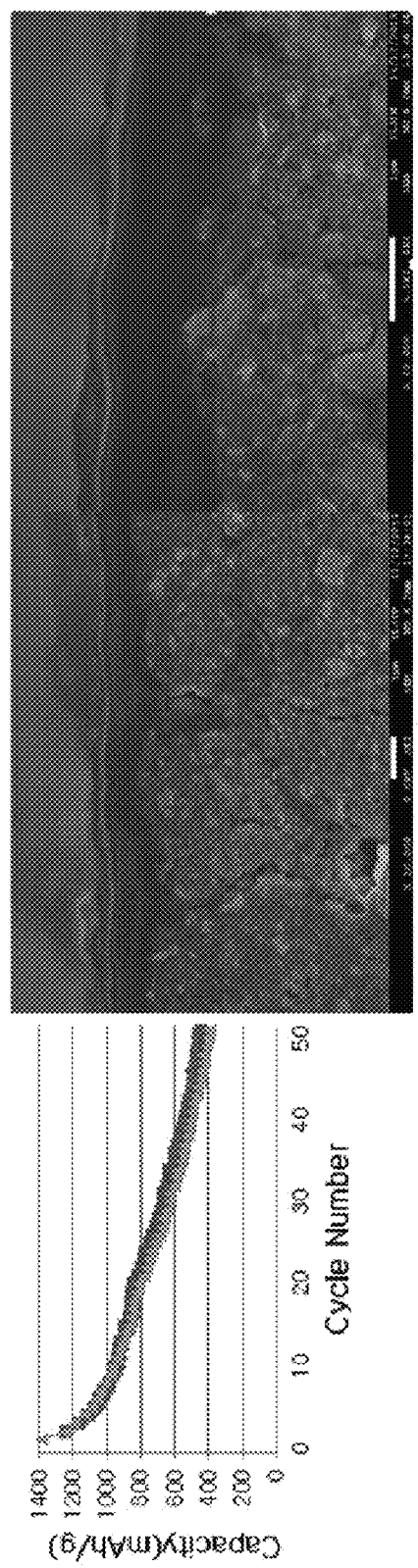

FIG. 11A is a diagram illustrating an XRD peak characteristic and a state before a life test of the negative electrode active material, and illustrates states at the time of the slow cooling and the fast cooling. In the meantime, FIG. 11B illustrates a state in which the matrix material is dispersed, expansion is severe, and a capacity is sharply decrease after 50 cycles.

It will be appreciated by those skilled in the art that the present invention as described above may be implemented into other specific forms without departing from the technical spirit thereof or essential characteristics. Thus, it is to be appreciated that embodiments described above are intended to be illustrative in every sense, and not restrictive. The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A negative electrode active material for a secondary battery, comprising:
   a silicon (Si) layer that is a crystal layer; and
   a matrix layer formed on an outer surface of the Si layer,
   wherein a crystal lattice mismatch ratio of the matrix layer to the Si layer is within 20%,
   wherein an amorphization degree of a silicon alloy is 25% to 65%, and an X-Ray Diffraction (XRD) peak of the silicon alloy has a value of $I_{Si}/I_{matrix} > 1$,
   wherein $I_{Si}$ is an intensity value of a maximum value among the XRD peaks in the silicon, and $I_{matrix}$ is an intensity value of a maximum value among the remaining peaks except for an Si phase.

2. A negative electrode active material of claim 1, wherein a crystal lattice parameter of the matrix layer is a ½ time or an integer time of a crystal lattice parameter of the Si layer.

3. The negative electrode active material of claim 1, wherein the lattice mismatch ratio of the matrix layer to the Si layer is within 10%.

4. The negative electrode active material of claim 1, wherein the lattice parameter of the matric layer is obtained by an equation below, $$a_{Matrix\_cubic} = \tfrac{1}{2}(a_{Si} \pm 20\%) = 2.172 \text{ to } 3.259 \text{ Å}.$$

5. The negative electrode active material of claim 1, wherein the lattice parameter of the matric layer is obtained by an equation below, $$a_{Matrix\_cubic} = a_{Si} \pm 20\% = 4.345 \text{ to } 6.517 \text{ Å}.$$

6. The negative electrode active material of claim 1, wherein the lattice parameter of the matric layer is obtained by an equation below, $$a_{Matrix\_cubic} = 2(a_{Si} \pm 20\%) = 8.690 \text{ to } 13.03 \text{ Å}.$$

7. The negative electrode active material of claim 1, wherein the lattice parameter of the matric layer is obtained by an equation below, $$a_{Matrix\_cubic} = \tfrac{1}{2}(a_{Si} \pm 10\%) = 2.444 \text{ to } 2.987 \text{ Å}.$$

8. The negative electrode active material of claim 1, wherein the lattice parameter of the matric layer is obtained by an equation below, $$a_{Matrix\_cubic} = a_{Si} \pm 10\% = 4.888 \text{ to } 5.974 \text{ Å}.$$

9. The negative electrode active material of claim 1, wherein the lattice parameter of the matric layer is obtained by an equation below, $$a_{Matrix\_cubic} = \tfrac{1}{2}(a_{Si} \pm 10\%) = 9.776 \text{ to } 11.948 \text{ Å}.$$

10. The negative electrode active material of claim 1, wherein the negative electrode active material includes the Si layer, an amorphous matrix layer outside the Si layer, and a nano grain matrix layer formed on an interface of the Si layer and the amorphous matrix layer, and the interface between the Si layer and the amorphous matrix layer is a coherent or a semi-coherent interface.

11. The negative electrode active material of claim 1, wherein when the matrix layer of the negative electrode active material is crystallized, a crystal system is a cubic structure.

12. The negative electrode active material of claim 1, wherein when the matrix layer of the negative electrode active material is crystallized, a crystal system is a face-centered cubic (FCC) structure.

13. The negative electrode active material of claim 1, wherein when the matrix layer of the negative electrode active material is crystallized, a crystal system is a body-centered cubic (BCC) structure.

14. The negative electrode active material of claim 1, wherein when the matrix layer of the negative electrode active material is crystalized, a crystal system is a hexagonal close packed (HCP) structure, and a ratio of c/a is a range of 1.470 to 1.796, and the matrix layer is regulated by an equation below, $$a_{Matrix\_HCP} = \sqrt{2}/2 * a_{Matrix\_cubic}.$$

15. The negative electrode active material of claim 1, wherein the negative electrode active material is formed by a chemical formula below, and has an expansion rate after 50 cycles of 70 to 150%, and an amorphization degree of a fine crystal region on the matrix within an alloy of 25% to 65%,

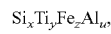

wherein x, y, z, and u are atom % (at %) and x=1−(y+z+u), 0.09≤y≤0.14, 0.09≤z≤0.14, and 0.01<u<0.2.

* * * * *